(12) United States Patent
Takamatsu et al.

(10) Patent No.: US 6,866,090 B2
(45) Date of Patent: Mar. 15, 2005

(54) AIR CONDITIONING APPARATUS FOR VEHICLE

(75) Inventors: Yoshikazu Takamatsu, Tokyo (JP); Hiromi Takasaki, Tokyo (JP); Nobuo Ichimura, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 739 days.

(21) Appl. No.: 09/790,716

(22) Filed: Feb. 23, 2001

(65) Prior Publication Data

US 2001/0020786 A1 Sep. 13, 2001

(30) Foreign Application Priority Data

Feb. 24, 2000 (JP) .................................. P. 2000-047528
Mar. 31, 2000 (JP) .................................. P. 2000-096497
Feb. 6, 2001 (JP) .................................. P. 2001-030055

(51) Int. Cl.[7] .......................... B61D 27/00; F28D 7/10; F25B 41/00
(52) U.S. Cl. .......................... 165/41; 165/42; 165/154; 62/113; 62/513
(58) Field of Search ........................... 165/41, 42, 154, 165/174, 175, 176, 67; 62/513, 515, 516, 498, 499, 509; 285/123.15, 123.1, 123.16, 123.17; 138/38, 114, 116

(56) References Cited

U.S. PATENT DOCUMENTS

| 3,823,573 A | * | 7/1974 | Cassady ..................... 62/498 |
| 4,199,955 A | * | 4/1980 | Jonsson ....................... 62/79 |
| 4,359,879 A | * | 11/1982 | Wright ........................ 62/513 |
| 4,936,113 A | * | 6/1990 | Nivens ........................ 62/513 |
| 5,076,068 A | * | 12/1991 | Mikhail ....................... 62/215 |
| 5,172,758 A | * | 12/1992 | Aoki .......................... 165/174 |
| 5,511,384 A | * | 4/1996 | Likitcheva ................... 165/154 |
| 5,931,184 A | * | 8/1999 | Armenia et al. ............ 137/312 |

FOREIGN PATENT DOCUMENTS

JP 11028932 A * 2/1999

* cited by examiner

*Primary Examiner*—Henry Bennett
*Assistant Examiner*—Tho V Duong
(74) *Attorney, Agent, or Firm*—Sughrue Mion, PLLC

(57) ABSTRACT

An air-conditioning apparatus for a vehicle wherein noise in the passenger's compartment is reduced by suppressing transmission of vibration to the evaporator, and the prevention of coolant leakage is enhanced, and at the same time, the man-hours for inspection are reduced by reducing the number of pipe joints. The cooling capacity is also enhanced by replacing the sub-cooling process in the condenser and the super-heating process in the evaporator, and further space in the narrow engine compartment is effectively used.

4 Claims, 16 Drawing Sheets

AIR CONDITIONING APPARATUS FOR VEHICLE

BACKGROUND OF THE INVENTION

1. Field of the Invention

The invention relates to a joint for duplex pipes where an outer pipe, an inner pipe provided inside of the outer pipe, and ribs for connecting both pipes are integrally formed as one body through an extruding process or drawing process, and relates to a method of brazing the joint to a duplex pipe. Further, the invention relates to an air-conditioning apparatus for a vehicle, which suppresses transmission of vibration from an engine and compressor to an evaporator, and reduces noise in the passenger's room.

2. Description of the Related Art

As is well known, a duplex pipe is provided with an outer pipe for passing a first fluid and an inner pipe provided inside of the outer pipe for passing a second fluid. Being classified by manufacturing methods, there are two types of duplex pipes.

One type of the duplex pipe is such duplex pipes where an outer pipe and an inner pipe are produced separately and independently, and the inner pipe is inserted into the outer pipe, and the outer pipe is subjected to a drawing process so that projections projecting on the inner wall of the outer pipe are pressed to the outer wall of the inner pipe.

The other type is such a duplex pipe where the outer pipe, the inner pipe and the ribs connecting both are integrally formed by the extruding process or drawing process. Recently, from the viewpoint of lowering the prime cost of production, the duplex pipes of the latter type of connecting the outer pipe and the inner pipe via the ribs have been frequently practiced.

The Japanese Patent No. 2595578 describes a joint for a pipe system having a duplex structure of an outer-side hose and an inner-side hose made of rubber.

However, the joint structure described in the above publication can be applied to a case where the outer pipe and the inner pipe are separately composed, but cannot be applied to the duplex pipes in which the outer pipe, the inner pipe and the ribs are integrally formed.

The duplex pipes and the joint for the duplex pipes may be utilized in a cooling cycle for an air conditioning apparatus.

In the cooling cycle for the air-conditioning apparatus for the vehicle, as shown in FIG. 26, a gas coolant heated to a high temperature and pressurized to a high pressure by the compressor 1101 flows to the condenser 1102, and becomes a high pressure liquid coolant or gas-liquid mixture coolant after exchanging heat with the atmosphere. This high pressure coolant becomes a low temperature and low pressure liquid coolant or low gas-liquid mixture coolant through adiabatic expansion by the expansion valve 1106 after separation into a gas and liquid in the liquid tank 1103. This low pressure coolant flows to the evaporator 1104 installed in the passenger's room, and cools the air in the compartment by exchanging heat with the air, and returns to the compressor 1101 as a low pressure gas coolant.

In such a cooling cycle, the compressor 1101 and the condenser 1102 are connected by the high pressure coolant pipe 1105a, the condenser 1102 and the liquid tank 1103 are connected by the high pressure coolant pipe 1105b, the liquid tank 1103 and the evaporator 1104 are connected by the high pressure coolant pipe 1105c, and the evaporator 1104 and the compressor 1101 are connected by the low pressure coolant pipe 1110. Additionally, at the connecting portions of the pipe for coolant 1105a through 1105c, and 1110, pipe joints are used, as a result, in the whole of the cooling cycle, and in total eight pipe joints 1121 through 1128 are installed. In the Figure, the numerals 1131 and 1132 show the pipe for absorbing vibration.

Incidentally, the driving force of the engine is transmitted to the compressor 1101 through a belt which is not shown, and the vibration of the engine travels to the compressor 1101. Further, the compressor 1101 generates a pulsating sound when taking in, compressing and discharging the coolant.

Therefore, the vibration and pulsation of the engine and compressor 1101 gives more vibration to the low pressure coolant pipe 1110 provided to connect the compressor 1101 and the evaporator 1104, and further this travels to the evaporator 1104 through this coolant pipe 1110 and makes a vibration thereon, as a result, which possibly causes noise in the passenger's room.

Since there are a total of eight pipe joints installed at the connecting portions of coolant pipe 1105a through 1105c, and 1110 in the whole of cooling cycle as explained above, there are many pipe joints which possibly causes leakage of the coolant, and causes a problem that many man-hours are required to perform leakage inspection after installing the pipe.

Further, as explained above, the high pressure liquid coolant or gas-liquid mixture coolant is supplied from the condenser 1102 to the expansion valve 1106, in order to stabilize the supply of the liquid coolant to this expansion valve 1106 and to enhance the cooling capacity, it is preferable to use a sub-cooling process in which providing proper over-cooling at around the outlet of the condenser 1102 brings sufficient liquid coolant. To adopt this method, the condenser 1102 inevitably becomes large in scale.

Further, the low pressure gas coolant is supplied from the evaporator 1104 to the compressor 1101, and in order to prevent liquid compression in the compressor 1101 and to enhance the cooling capacity, it is preferable to use a superheating method in which providing proper overheating at around the outlet of the evaporator 1104 brings sufficient gas coolant. To adopt this method, the evaporator 1104 inevitably becomes large in scale, at the same time, and the performance is degraded by worsening dividing flow.

Further, space is required to ensure that two kinds of pipe, high pressure coolant pipe 1105a through 1105c and low pressure coolant pipe 1110, are separately installed, however, there is a requirement that a narrow engine compartment be used effectively if possible.

SUMMARY OF THE INVENTION

It is accordingly an object of the invention to provide a joint for duplex pipes to be suitably applied to duplex pipes integrally formed of the outer pipe, the inner pipe and the connecting ribs.

Further, another object of the invention is to provide a method of brazing a joint for duplex pipes to a duplex pipe to be suitably applied to duplex pipes integrally formed of the outer pipe, the inner pipe and the connecting ribs.

Furthermore, another object of the invention is to provide an air-conditioning apparatus for a vehicle wherein noise in the passenger's room is reduced by suppressing transmission of vibration to the evaporator, and reliability to prevent coolant leakage is enhanced, and at the same time, the man-hours for inspection are reduced by reducing the number of pipe joints, the cooling capacity is enhanced by replacing the sub-cooling process in the condenser and the super-heating process in the evaporator, and further space in the narrow engine compartment is effectively used.

The objects of the invention can be accomplished by the following joint and apparatus.

According to the invention, there is provided a joint for a duplex pipe including an outer pipe for passing a first fluid, an inner pipe disposed inside of the outer pipe, the inner pipe for passing a second fluid, and a rib for connecting the outer pipe with the inner pipe, wherein the outer pipe is eliminated at an end portion to expose the inner pipe, the joint comprising:

a main body disposed at the end portion of the outer pipe to cover the inner pipe exposed, the main body defining a passage for passing the first fluid flowing inside the outer pipe, the main body defining a first opening communicated with the passage, and a second opening penetrated by the inner pipe exposed;

a first connecting portion defining a first through hole communicated with a first outlet pipe;

a second connecting portion defining a second through hole for connecting the inner pipe with a second outlet pipe; and a connecting pipe for guiding the first fluid to the first connecting portion, one end of the connecting pipe disposed at the first opening, the other end of the connecting pipe disposed at the first through-hole of the first connecting portion;

wherein the first opening is formed at a predetermined position in response to disposed conditions of the connecting pipe to utilize the main body in common.

The second connecting portion may be integrally formed with the inner pipe, and has a joining portion for connecting the second connecting portion to the second outer pipe.

The main body may have a wall defining the first opening.

The wall may have a concave portion for holding a connecting material for connecting the inner pipe.

The connecting pipe may have a connecting portion connected at an edge of the first opening and expanded outward in a radial direction of the first opening.

The first opening may be formed to be adjustable with respect to an attaching position of the connecting pipe to the first opening.

The first connecting portion and the second connecting portion may be formed in a flange type or union type.

The first connecting portion of the flange type and the second connecting portion of the flange type may be integrally formed with each other.

The second connecting portion of the flange type may have a through hole inserting a tightening structure, and the through hole may be formed in a direction different from a direction where the inner pipe penetrates the wall.

According to the invention, there is provided a joint for a duplex pipe including an outer pipe for passing a first fluid, an inner pipe disposed inside of the outer pipe, the inner pipe for passing a second fluid, and a rib for connecting the outer pipe with the inner pipe, wherein the outer pipe is eliminated at an end portion to expose the inner pipe, the joint comprising:

a main body formed in a block shape, the main body disposed at the end portion of the outer pipe to cover the inner pipe exposed, the main body forming a passage for passing the first fluid flowing inside the outer pipe; the main body defining a first opening for supplying the first fluid from the passage to a first outer pipe, and a second opening for supplying the second fluid from the inner pipe to a second outer pipe;

wherein the inner pipe exposed from the end portion of the outer pipe crosses the passage and elongates substantially in straight.

According to the invention, there is provided a joint for a duplex pipe including an outer pipe for passing a first fluid, an inner pipe disposed inside of the outer pipe, the inner pipe for passing a second fluid, and a rib for connecting the outer pipe with the inner pipe, wherein the outer pipe is eliminated at an end portion to expose the inner pipe, the joint comprising:

a main body formed in a block shape, the main body defining a first passage for passing the first fluid and a second passage for passing the second fluid, the main body defining a first opening for communicating the first passage with a first outer pipe guiding the first fluid, a second opening for communicating the second passage with a second outer pipe guiding the second fluid;

a first connecting portion connecting an end of the outer pipe with the first passage;

a second connecting portion connecting an end of the inner pipe with the second passage, the second connecting portion defining a concave portion;

a stopper for engaging the end of the outer pipe or the end of the inner pipe with at least one of the first connecting portion and the second connecting portion; and a brazing material brazed in the concave portion of the second connecting portion, the brazing material for brazing the end portion of the inner pipe to the second connecting portion.

The concave portion may have a tapered form in cross section to be smaller toward an end.

A release mouth of the concave portion may be turned upward when the end portion of the inner pipe is brazed to the second connecting portion, to temporarily support the brazing material and store the brazing material fused therein.

The main body may comprises: a first wall defining a blind hole in the first passage; and a second wall continuing to the first wall and defining a through hole communicating with the blind hole;

the first connecting portion is formed at the through hole; and a blind plug is attached to a release end of the blind hole to close the release end.

The main body may comprise a first wall defining a blind hole in the first passage, and the first connecting portion is formed at a release end of the blind hole.

According to the invention, there is provided a method of brazing a joint with a duplex pipe including an outer pipe for passing a first fluid, an inner pipe disposed inside of the outer pipe, the inner pipe for passing a second fluid, and a rib for connecting the outer pipe with the inner pipe, wherein the outer pipe is eliminated at an end portion to expose the inner pipe, the method comprising:

positioning the end portion of the inner pipe to the second connecting portion so that a brazing material is supported in a concave portion formed in the second connecting portion;

positioning the end portion of the outer pipe to the first connecting portion and disposing a brazing material to the first connecting portion;

disposing the main body to turn a release mouth of the concave portion upward;

heating the main body and the first connecting portion so as to fuse the brazing material placed in the concave portion and the brazing material placed to the first connecting portion; and brazing the end portion of the outer pipe to the first connecting portion and the end portion of the inner pipe to the second connecting portion at the same time.

The method may comprises: engaging the end portion of the outer pipe or the end portion of the inner pipe at the front end thereof with a stopper formed in at least one of the first and second connecting portion;

whereby the end portion of the inner pipe is positioned in the second connecting portion, and the end portion of the outer pipe is positioned in the first connecting portion.

The method may comprises:

disposing a blind plug to close a release end of a blind hole bored in the main body for defining an inner passage;

disposing a brazing material to a third connecting portion between the release end and the blind plug; and heating the third connecting portion to fuse the brazing material disposed at the third connecting portion to braze the blind plug to the third connecting portion.

In the method, the brazing step of the end portion of the outer pipe, the brazing step of the end portion of the inner pipe, and the brazing step of the blind plug may be concurrently performed.

Any one of the brazing step of the end portion of the outer pipe, the brazing step of the end portion of the inner pipe, and the brazing step of the blind plug may be performed in advance.

The brazing steps may include a pre-heating to heat the main body and a main-heating to heat the main body and the first connecting portion.

According to the invention, there is provided an air-conditioning apparatus for vehicle, the apparatus comprising:

a compressor for heating and pressurizing a gas coolant to high temperature and a high pressure;

a condenser for exchanging heat of the gas coolant with atmosphere to be a high pressure liquid coolant or gas-liquid mixture coolant;

a liquid tank for separating the high pressure liquid coolant or gas-liquid mixture coolant into gas and liquid;

an expansion valve for making a low temperature and low pressure liquid coolant or gas-liquid mixture coolant through adiabatic expansion;

an evaporator installed in a passenger's room of the vehicle, the evaporator for cooling air in the passenger's room by exchanging heat with the air of the passenger's room using the low temperature and low pressure liquid coolant or gas-liquid mixture coolant to be returned to the compressor as the low pressure gas coolant;

a high pressure coolant pipe for carrying the coolant from the compressor to the evaporator through the condenser; and a low pressure coolant pipe for carrying the coolant from the evaporator to the compressor, wherein at least a part of one of the low pressure coolant pipe and high pressure coolant pipe is inserted into the other thereof or both pipes are arranged in parallel; and a part of the low pressure coolant pipe is secured to the condenser.

A part of the low pressure coolant pipe may be formed integrally with a header pipe of the condenser.

The liquid tank may be directly mounted on a header pipe of the condenser.

An anti-vibration member may support the condenser.

DETAILED DESCRIPTION OF THE PRESENT INVENTION

The present invention will be described with reference to the accompanying drawings.

First Embodiment

Figure 1:
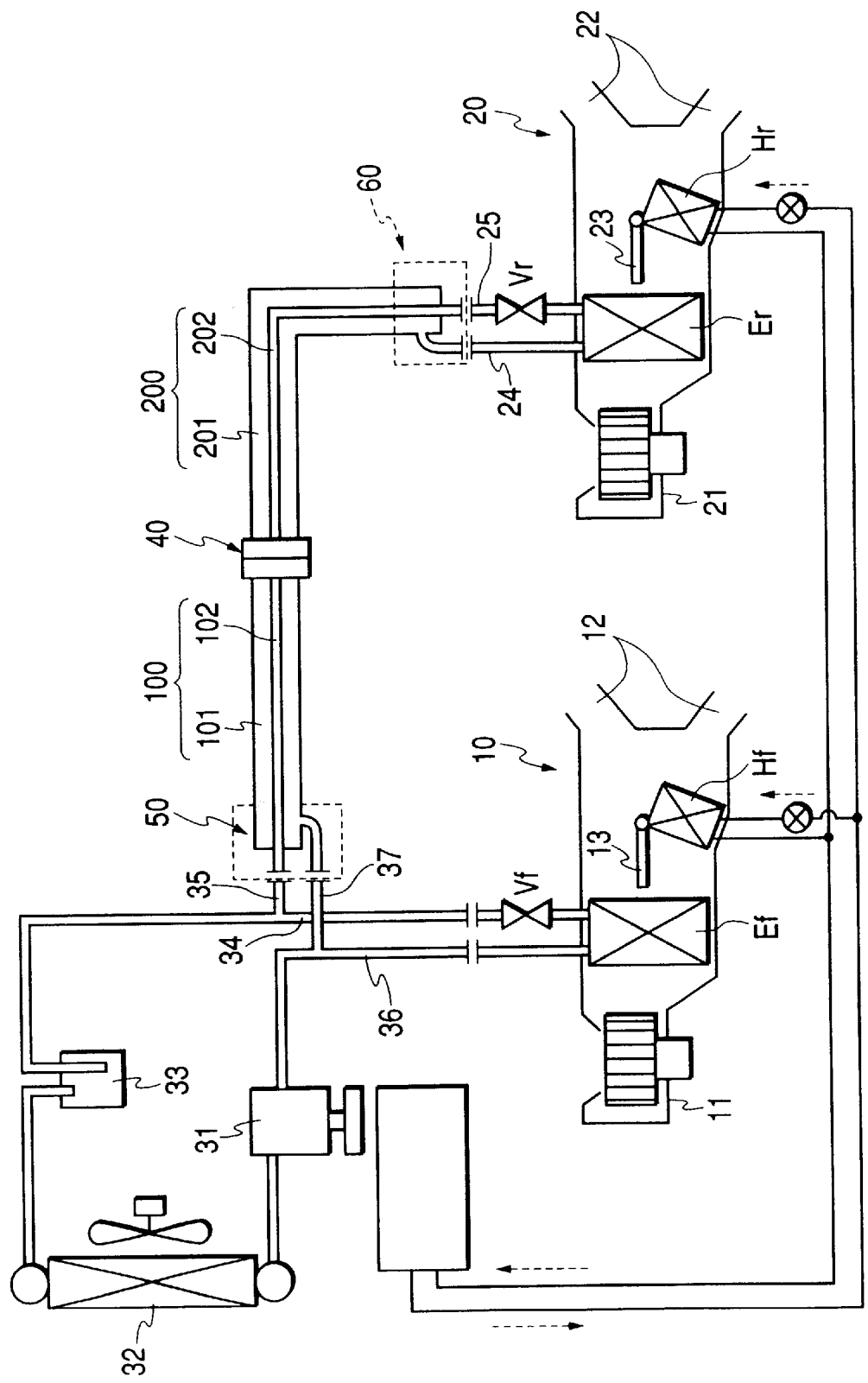
FIG. 1 is a schematic view showing an air conditioning apparatus for vehicle relating to the first to fifth embodiments of the invention.
Figure 2:
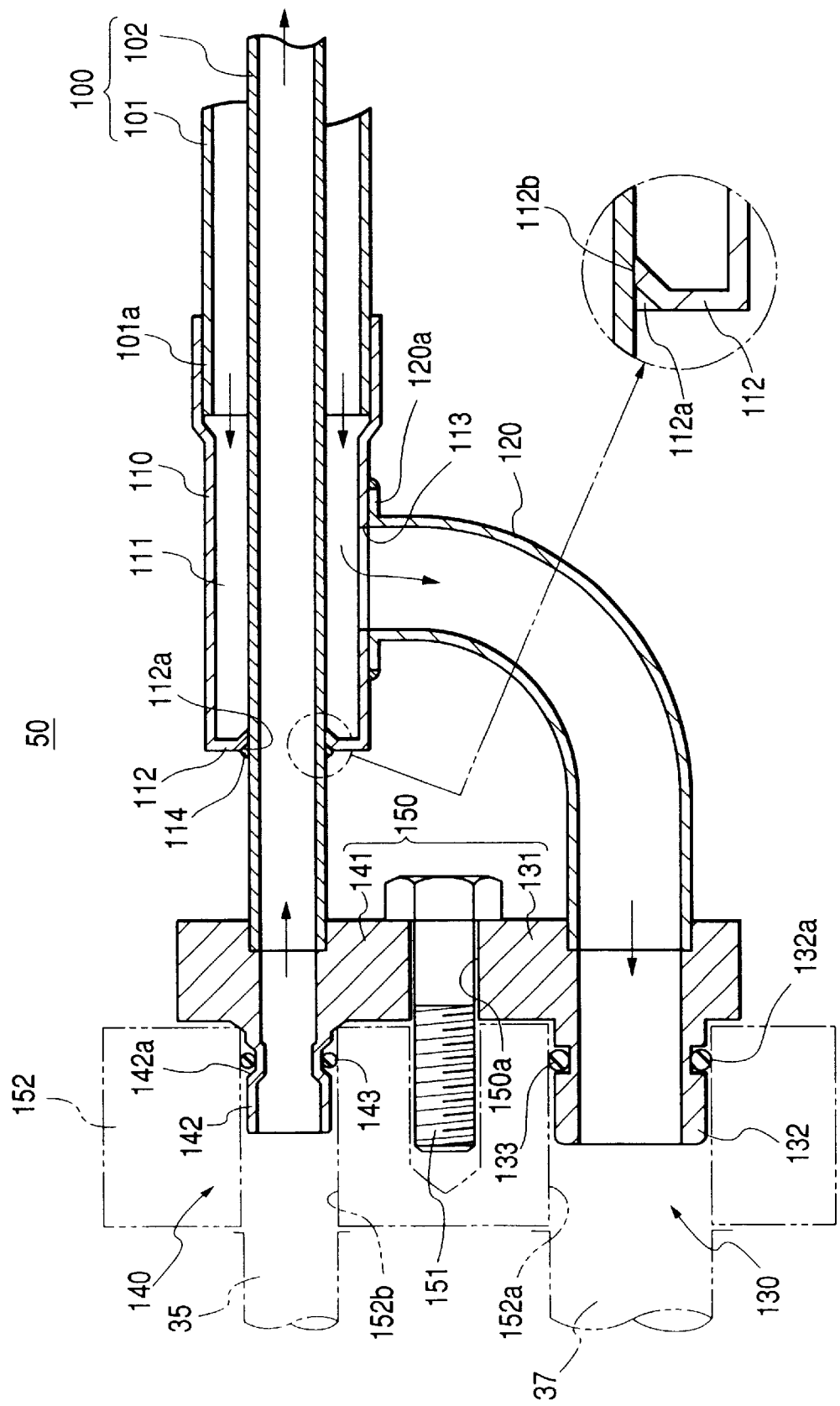
FIG. 2 is a cross sectional view showing a joint for duplex pipes relating to the first embodiment.
Figure 3:
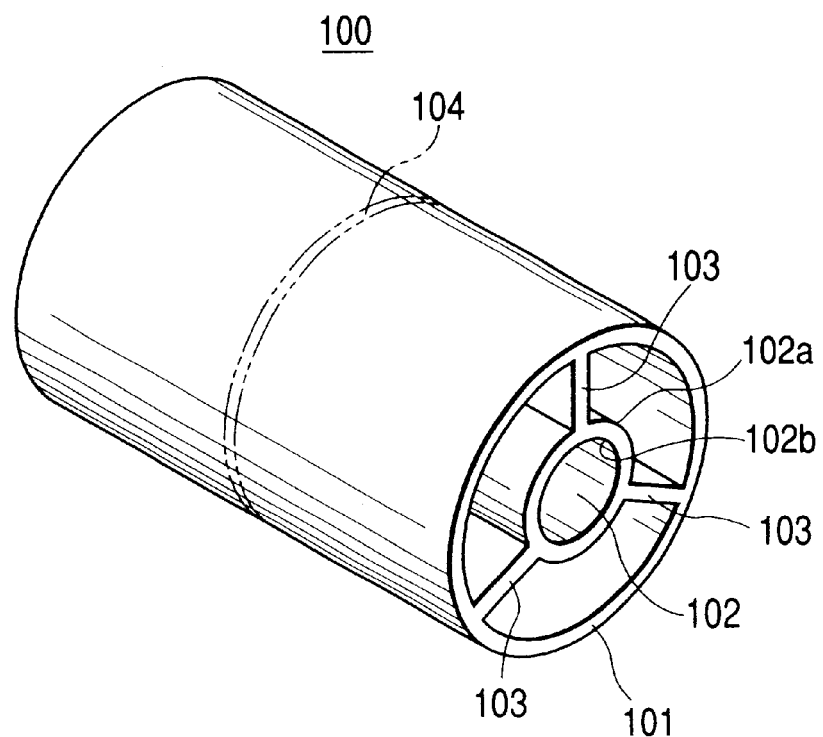
FIG. 3 is a perspective view showing the duplex pipe.

FIG. 1 is a schematic view showing an air conditioning apparatus for vehicle relating to a first embodiment to which the joint for duplex pipes of the invention is applied, FIG. 2 is a cross sectional view showing the joint for duplex pipes, and FIG. 3 is a perspective view showing the duplex pipes.

The air conditioning apparatus for vehicle shown in FIG. 1 is a dual type used in so-called one box car which is equipped with an air conditioner 10 for mainly air-conditioning a front seat and an air conditioner 20 for mainly air-conditioning a rear seat. The rear seat air conditioner 20 is installed at a central part or nearly to a rear part. In the respective front seat and rear seat air conditioners 10, 20, an air taken in by intake units 11, 21 is guided to unit cases for cooling through evaporators Ef, Er within the unit cases, and the cooled air is heated by heater cores Hf, Hr, or is mixed with the heated air by bypassing the heater cores Hf, Hr to be at a desired temperature, and thereafter is blown off into a cabin via respective diffusers 12, 22. In front of the heater cores Hf, Hr, there are turnably mixing doors 13, 23 which diverge the cooled air at a desired ratio into an air passing the heater cores Hf, Hr and an air bypassing the heater cores Hf, Hr.

"Evaporators Ef, Er" mean that a coolant at low temperature pressure-reduced by such as expansion valves Vf, Vr flows inside, and the air introduced here is cooled by heat-exchanging with the coolant. "Heater cores HF, Hr" mean that an engine cooling water at high temperature flows inside, and the air introduced here is heated by heat-exchanging with the engine cooling water at high temperature.

A cooling cycle is composed by connecting the front evaporator Ef, the rear evaporator Er, a compressor 31, a capacitor 32, a liquid tank 33 and the expansion valves Vf, Vr with a coolant conduit. A liquid coolant of relatively high temperature and high pressure issued from the liquid tank 33 passes the cooling conduits 34, 35 diverged in the engine room, and goes into the front evaporator Ef and the rear evaporator Er, respectively. A gas coolant of relatively low temperature and low pressure issued from the front evaporator Ef and the rear evaporator Er passes the cooling conduits 36, 37, joins within the engine room and is sucked by the compressor 31.

The first embodiment employs the duplex pipes for the coolant conduit connecting the rear evaporator Er and the cooling cycle, and has first duplex pipes 100 to be connected to the coolant pipes 35, 37 and second duplex pipes 200 to be connected to the rear evaporator Er. These two pieces of duplex pipes 100, 200 are connected via a joint 40. The gas coolant of low pressure (corresponding to the first fluid) from the rear evaporator Er is passed into the outer pipes 101, 201, while the liquid coolant of high pressure (corresponding to the second fluid) from the liquid tank 33 is passed into the inner pipes 102, 202. At the end part of the first duplex pipes 100, through the joint 50 for duplex pipes, the outer pipe 101 is connected to the coolant pipe 37, while the inner pipe 102 is connected to the coolant pipe 35, respectively. At the end part of the second duplex pipes 200, through the joint 60 for duplex pipes, the outer pipe 201 is connected to an outlet pipe 24 of the rear evaporator Er, while the inner pipe 202 is connected to an inlet pipe 25 of the expansion valve, respectively.

The duplex pipe 100 is, as shown in FIG. 3, formed of aluminum material as one body fabricated with the outer pipe 101, the inner pipe 102, and the ribs 103 connecting both by the extruding process or the drawing process. The outer diameter of the outer pipe is around ø16 to 25 mm, and the outer diameter of the inner pipe is around ø6 to 12 mm. The connecting ribs 103 are disposed to trisect a space between the outer pipe 101 and the inner pipe 102. As the connecting ribs 103 are three pieces, a triaxial bending is good balanced, and a degree of freedom of a bending design is heightened. The balance for practicing the extruding process is satisfied. As the duplex pipes 200 are fabricated in the same manner, a further explanation is omitted.

The case of using the duplex pipes 100, 200 as the coolant pipes connecting the rear evaporator Er and the cooling cycle brings about the following merits in comparison with a case of separately installing a conduit of passing the coolant of low pressure and a conduit of passing the coolant of high pressure. Namely, as the rigidity is strong against bending, a limitation is moderated with respect to the bending speed at production to increase productivity. The conduits where two pieces make one pair become one piece, so that the bending processing number is reduced by half to curtail the processing cost. As the rigidity is made strong, during transportation or when attaching to a car body, deformation is less to occur, and it is unnecessary to secure one-side coolant conduit to another-side coolant conduit via a bracket, costing down and improving a work of attaching to a car body.

Further reference will be made to structures of the joints 50, 60 for duplex pipes relating to the first embodiment. As both joints 50, 60 are formed in the same structure, explanation will be made to an example of the joint 50.

As shown in FIG. 2, the joint for duplex pipes 50 is of the flange type and has the main body 110 which is provided at its one end (the right end in FIG. 2) to an end portion 101a of the outer pipe exposing the inner pipe 102 by partially eliminating the outer pipe 101 and the connecting ribs 103. The main body 110 has a pipe shape encircling the exposed inner pipe 102, and is formed inside with a passage 111 for passing a gaseous coolant of low pressure getting out from the end portion 101a of the outer pipe. At the other end (the left end in FIG. 2) of the main body 110, there is provided a wall face part 112 through which the exposed inner pipe 102 penetrates. On the periphery of the main body 110, an opening 113 is formed, and is provided with a connecting pipe 120 communicating with the passage 111. The main body 110 is processed by pressing or forging, and shaped in a relatively large degree of freedom.

The connecting pipe 120 has an elbow shape extending in the same direction as the inner pipe 102. The first connecting part 130 combining the connecting pipe 120 is provided to the coolant conduit 37 (corresponding to a first outer pipe) for guiding the gaseous coolant of the low pressure. A second connecting part 140 communicating the inner pipe 102 with the coolant conduit 35 (corresponding to a second outer pipe) is provided at the end portion of the inner pipe 102 penetrating the wall face part 112.

The opening 113 is formed at a position to be determined in response to disposing conditions of the connecting pipe 120 such as length, extending directions or lay-out of the connecting pipe 120.

The wall face part 112 has a concave part 112a for supporting a brazing material 114 (corresponding to a connecting material) for connecting the penetrating inner pipe 102. The concave part 112a is formed by bending inward of the main body 110 an inner circumference of a central hole 112b inserting the inner pipe 102.

The connecting pipe 120 is connected to an edge of the opening 113 and has a combining part 120a expanded outward in the radial direction. The connecting pipe 120 is connected to the circumference of the main body 110 by brazing the combining part 120a to the edge part of the opening 113.

The first connecting part 130 and the second connecting part 140 are integrally composed in the flange type as exemplified. The first connecting part 130 has a first base 131 to be brazed to the end part of the connecting pipe 120 and a first ring-shaped projecting part 132 communicating with the outer pipe 101 via the connecting pipe 120 projecting from the first base 131 and the passage 111. The second connecting part 140 has a second base 141 to be brazed to the end part of the inner pipe 102 and a second ring-shaped projecting part 142 communicating with the inner pipe 102 projecting from the second base 141. The first base 131 and the second base 141 are made integral to compose a base 150.

A ring groove 132a formed in the first ring-shaped projecting part 132 is provided with a sealing material composed of such as an O-ring 133. By the O-ring 133 avoids leakage around parts connecting the coolant conduit 37. Similarly, a ring groove 142a formed in the second ring-shaped projecting part 142 is provided with a sealing material composed of such as an O-ring 143, which avoids leakage around parts connecting the coolant conduit 35.

A base 150 is formed with a through hole 150a for inserting a tightening structure composed of a bolt 151 or a screw. If a composed body 152 or the flange connected with the coolant conduits 35, 37 is tightened with the bolt 151, the connecting pipe 120 is connected to the coolant conduit 37 via the first connecting part 130, while the inner pipe 102 is connected to the coolant conduit 35 via the second connecting part 140.

Reference will be made to operation.

For connecting the duplex pipe 100 to the composed body 152 connected with the coolant pipes 35, 37, the first ring-shaped projecting part 132 and the second ring-shaped projecting part 142 of the joint 50 for duplex pipes are fitted in hole parts 152a, 152b formed in the composed body. Then, if tightening a bolt 151, the connection of the duplex pipe 100 is completed.

The joint 50 for duplex pipes of this first embodiment is a mode of attaching the main body 110 to the end portion 101a of the outer pipe exposing the inner pipe 102 and penetrating the exposed inner pipe 102 in the wall face part 112, and if applying the first embodiment to the duplex pipe 100 unitized of the outer pipe 101, the inner pipe 102, and the connecting ribs 103, a suited joint for duplex pipes is available.

As the connecting pipe 120 is brazed to the opening 113 of the main body 110, it is sufficient to only form the opening 113 at a predetermined place in response to disposing conditions of the connecting pipe 120, so that the degree of freedom designing dimensions and the degree of freedom for determining the lay-out are increased. Beside, even in the case of joint for duplex pipes different in disposing conditions of the connecting pipe 120, the main body 110 can be used in common, thereby to reduce the cost.

By the concave part 112a, the brazing material 114 is exactly supported at the connecting part between the wall face part 112 and the inner 102, so that the connection of the wall face part 112 and the inner pipe 102 after the brazing is made firm and leakage of the coolant is steadily avoided.

As the combining part 120a of the connecting pipe 120 is expanded outward in the radial direction, it does not obstruct to narrow the passage inside of the connecting pipe 120, so that resistance in the passage of the connecting pipe 120 can be reduced, not using a connecting pipe 120 having an inner diameter larger than unnecessarily.

Figure 4:
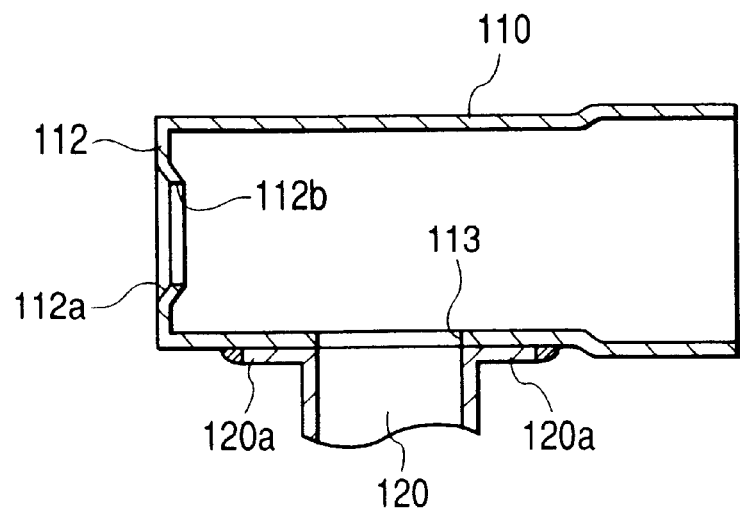
FIG. 4 is a cross sectional view showing a variation where the opening of a main body is formed to be oblong.

FIG. 4 is a cross sectional view showing a variation where the opening of the main body is formed to be oblong. As shown, the opening 113 is longer than an inner diameter of the connecting pipe 120, and may be formed to be oblong having a size to be closed by the combining part 120a of the connecting pipe 120. According to such a structure, an attaching position of the connecting pipe 120 to the opening 113 may be adjustable within the range of sizes of the connecting part 120a. Therefore, even in the case of a joint for duplex pipes different in disposing conditions of the connecting pipe 120, the main body 110 can be more used in common, more costing down. The opening 113 is not limited to the oblong hole, and only being formed to be adjustable with respect to attaching positions of the connecting pipe 120 to the opening 113, it is enough, for example, a round hole may be formed.

Figure 5:
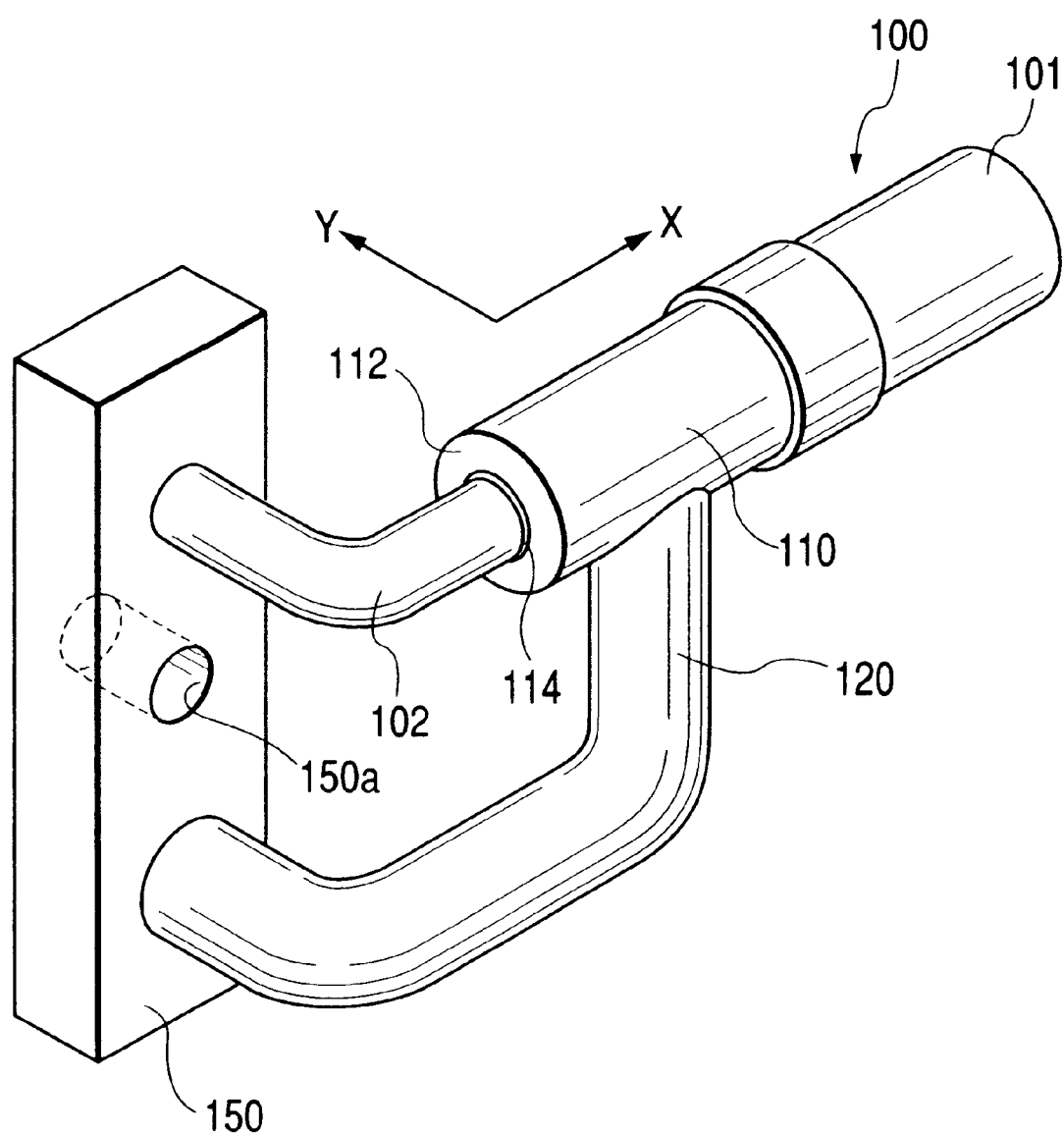
FIG. 5 is a view showing a variation of the first and second connecting parts composed to be flange type.

FIG. 5 is a view showing variations composed in the flange type of the first and second connecting parts 130, 140. As illustrated, ends of the inner pipe 102 and the connecting pipe 120 are bent in a direction Y substantially crossing with a direction X where the inner pipe 102 penetrates the wall face part 112. Therefore, a through hole 150a for inserting an tightening structure such as the bolt 151 is to be formed in the direction Y different from the direction X where the inner pipe 102 penetrates the wall face part 112. By such a structure, there is no obstacle as the duplex pipe 100 or main body 110 in the direction Y tightening the bolt 151. Being easy to get in the tightening tool as a spanner or a worker's hand thereinto, the tightening of the bolt 151 is easily operated and the connecting work of the duplex pipe 100 is made easy.

As the connecting pipe 120 is produced separately from the duplex pipe 100, shapes of the connecting pipe 120 can be determined appropriately, taking into consideration the workability upon connection. Therefore, if at least the second connecting part 140 has a through hole 150a for inserting the tightening structure 151, and this through hole 150a is formed in the direction Y different from the direction X where the wall face part 112 of the inner pipe penetrates, such a situation is also sufficient.

Figure 6:
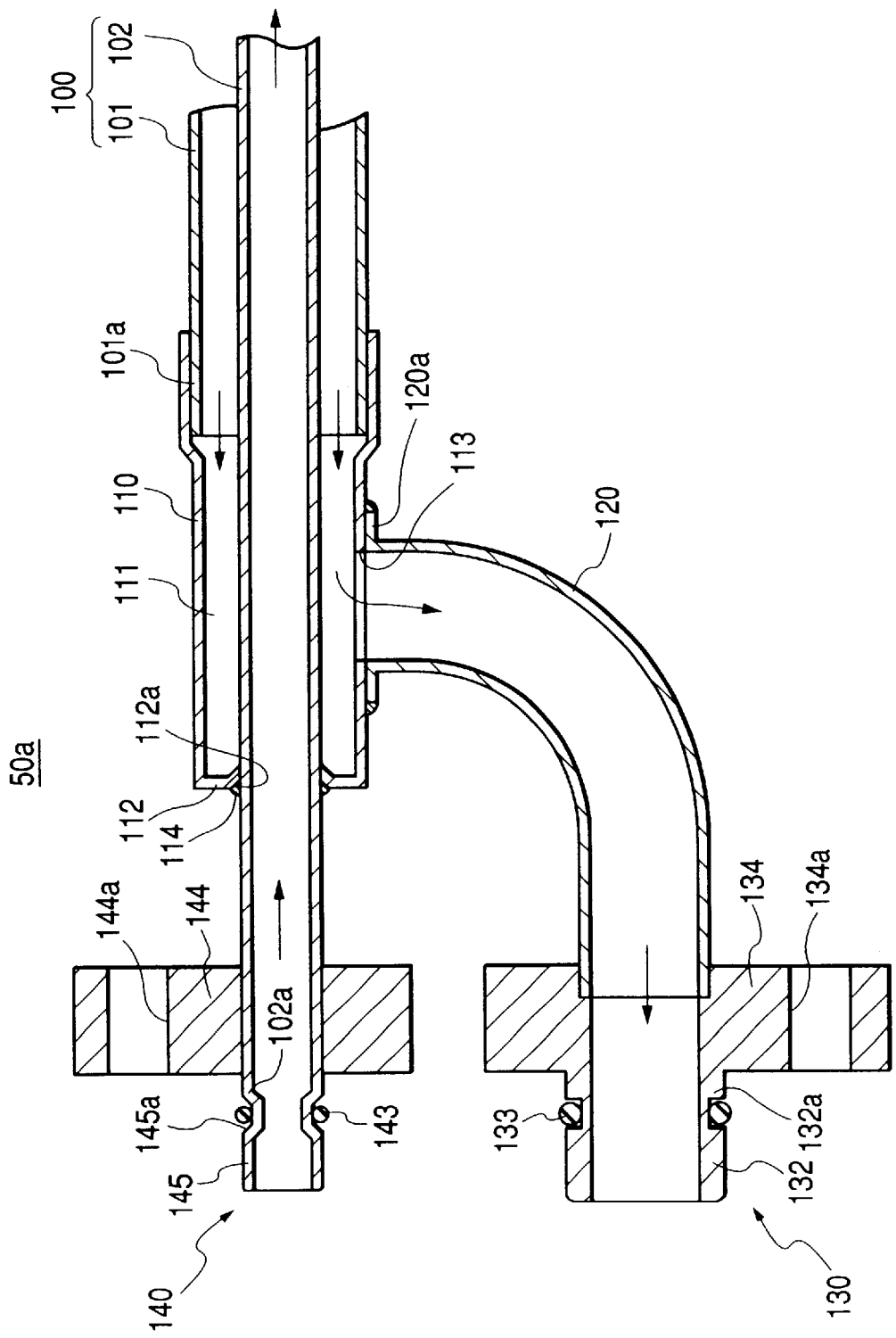
FIG. 6 is a cross sectional view showing a variation of separating the first and second connecting parts composed to be flange type.

The first and second connecting parts 130, 140 of the flange type are not limited to the embodiment formed as one body, but a separated flange type may be available as seen in FIG. 6. The first connecting part 130 of the joint 50a for duplex pipes is, as shown in FIG. 2, composed by brazing the first base 134 equipped with the first-ring shaped projecting part 132 to the end part of the connecting pipe 120. On the other hand, the second connecting part 140 has a second base 144 caulked to the inner pipe 102 and the connecting part 145 connected to the coolant conduit 35, and in particular, the connecting part 145 is formed in the inner pipe 102 by processing the terminal of the end portion of the inner pipe. In the connecting part 145, a ring groove 145a is formed for attaching the O-ring 143 by punching or rolling process to be performed on the end portion 102a of the inner pipe. In the respective first and second bases 134, 144, there are through holes 134a, 144a for inserting the tightening instrument being a bolt. As the connecting part 145 is formed in the end portion 102a of the inner pipe, the production of joints is made easier than a case of connecting a connection member separately produced to the end portion 102a of the inner pipe. The structure where the end portion 102a of the inner pipe is made the connecting part 145 by processing the terminal, is also applicable to the one body type flange shown in FIG. 2.

Figure 7:
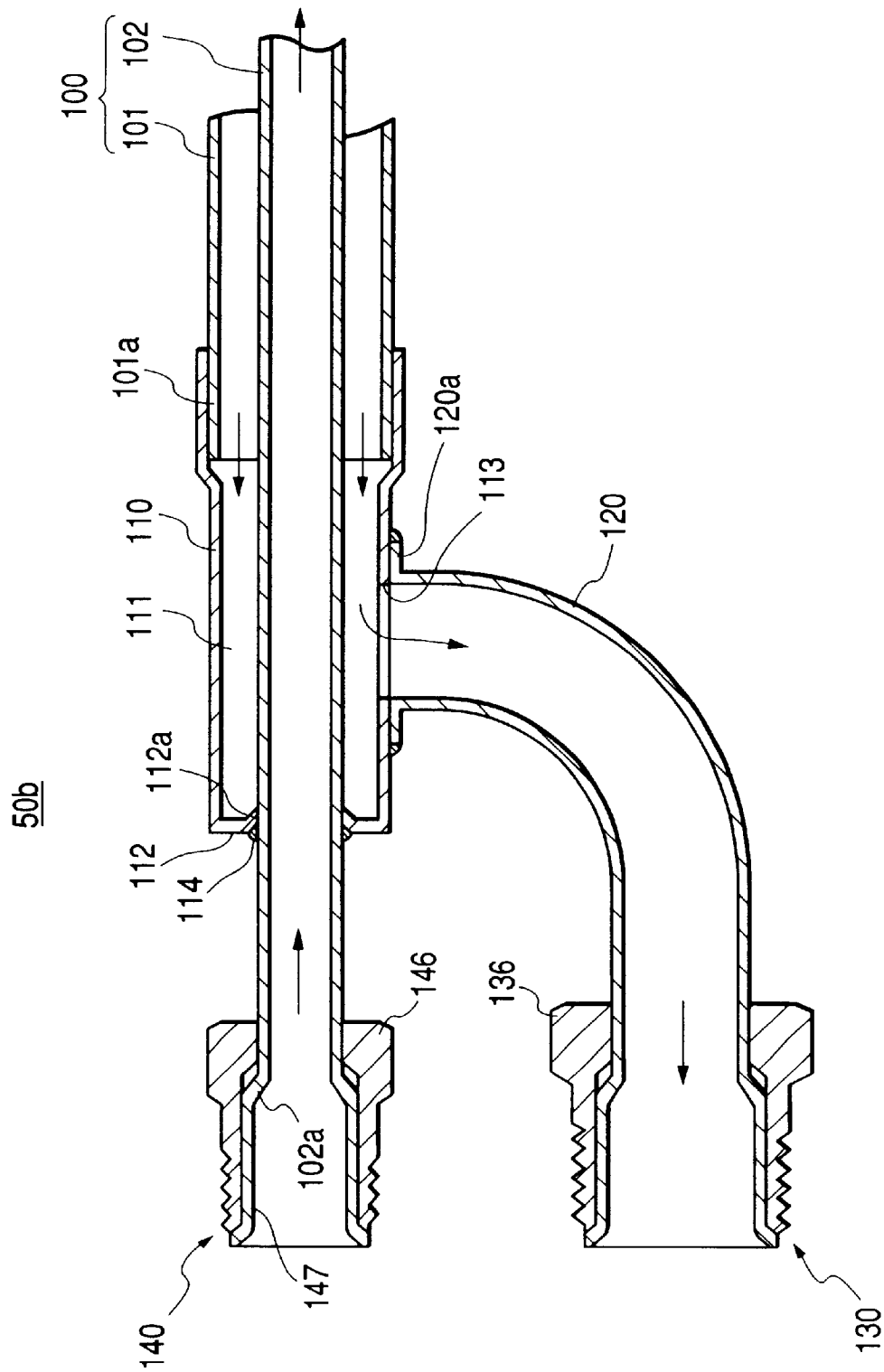
FIG. 7 is a cross sectional view showing a variation of composing the first and second connecting parts to be union type.

The first connecting part 130 and the second connecting part 140 are not limited to the flange type, but a union type may be available as seen in FIG. 7. In a joint 50b for duplex pipes, a union screw 136 is attached to the end part of the connecting pipe 120 and tightened with a union nut (not shown) provided at the end part of the coolant conduit 37. The end portion 102a of the inner pipe is also provided with a union screw 146 and tightened with a union nut (not shown) provided at the end part of the coolant conduit 35. The end portion 102a of the inner pipe has an expanded flare part 147 to be fitted in the inner periphery of the union screw 146. The flare part 147 is formed by punching to flare the end portion 102a of the inner pipe.

Figure 8:
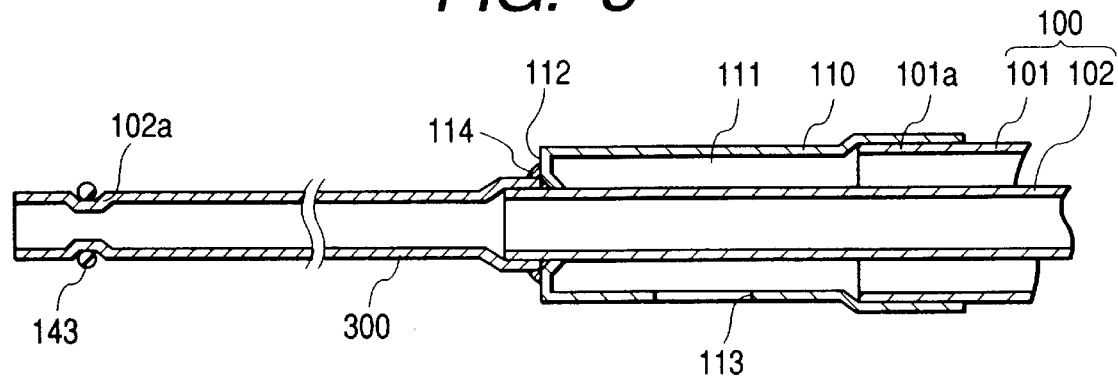
FIG. 8 is a cross sectional view showing a variation of using a separate pipe when exposing the inner pipe in lengthy size.

When the inner pipe 102 is exposed in lengthy size as seen in FIG. 8, a separate pipe 300 may be used. In the shown example, the end part of the pipe 300 corresponds to the end portion 102a of the inner pipe. The base of the pipe 300 is brazed with the brazing material 114 together with the end part of the inner pipe 102 and the wall face part 112.

As is seen from the above, the joints 50, 50a, 50b for duplex pipes in the first embodiment can be selected from the one-body flange, the separated flange and the nut union in response to the connecting structure of opposite sides, and are widely applicable.

Second Embodiment

Figure 9:
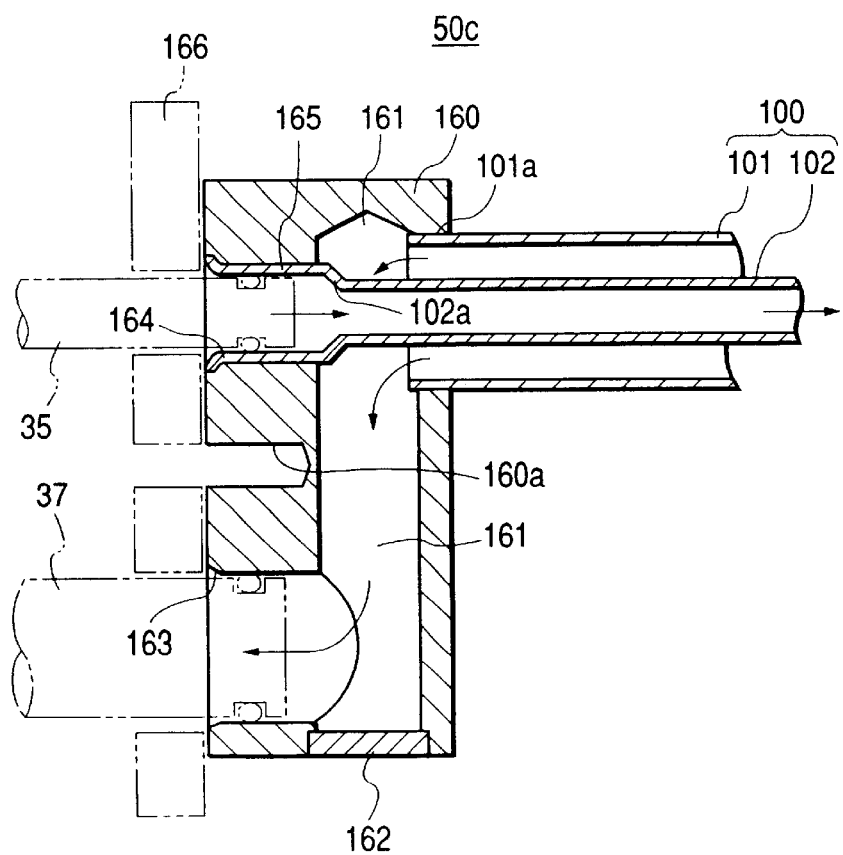
FIG. 9 is a cross sectional view showing a joint for duplex pipes relating to a second embodiment.

FIG. 9 is a cross sectional view showing a joint for duplex pipes relating to a second embodiment.

A joint 50c for duplex pipes of the second embodiment has a main body 160 provided by brazing on the end portion 101a of the outer pipe exposing the inner pipe 102 by partially eliminating the outer pipe 101 and the connection ribs 103. The main body 160 is fabricated with, e.g., aluminum material, and is block-shaped in which an inner passage 161 is machined for passing the gaseous coolant of low pressure flowing from the end portion 101a of the outer pipe. The release end of the inner passage 161 is closed by brazing the blind plug 162. Further, the main body 160 is formed with the first opening 163 for communicating the coolant conduit 37 guiding the gaseous coolant of low pressure and the inner passage 161 as well as the second opening 164 for communicating the coolant conduit 35 guiding the liquid coolant of high pressure. The first and second openings 163, 164 are formed by machining, extending in a direction crossing with the inner passage 161.

The inner pipe 102 exposed from the end portion 101a of the outer pipe crosses with the inner passage 161 and stretches straight, and is attached to the second opening 164. The end portion 102a of the inner pipe has the expanded flare part 165 to be inlaid in the inner periphery of the second opening 164. The flare part 165 is formed by punching to flare the end portion 102a of the inner pipe, and has the end part brazed to the second opening 164.

The main body 160 is formed with a screw hole 160a for tightening the tightening instrument as a bolt or a screw. By tightening the composed body 166 connected with the coolant conduits 35, 37 or the flange to the main part body 160 by means of the tightening instrument, the outer pipe 101 is connected to the coolant conduit 37 via the inner passage 161 and the first opening 163, and the inner pipe 102 is connected to the coolant conduit 35 via the second opening 164.

This joint 50c for duplex pipes is also the mode where the main body 160 is attached to the end portion 101a of the outer pipe exposing the inner pipe 102, and the exposed inner pipe 102 penetrates the main body 160, and if applying the second embodiment to the duplex pipe 100 unitized of the outer pipe 101, the inner pipe 102, and the connecting ribs 103, a suited joint for duplex pipes is available.

Figure 10:
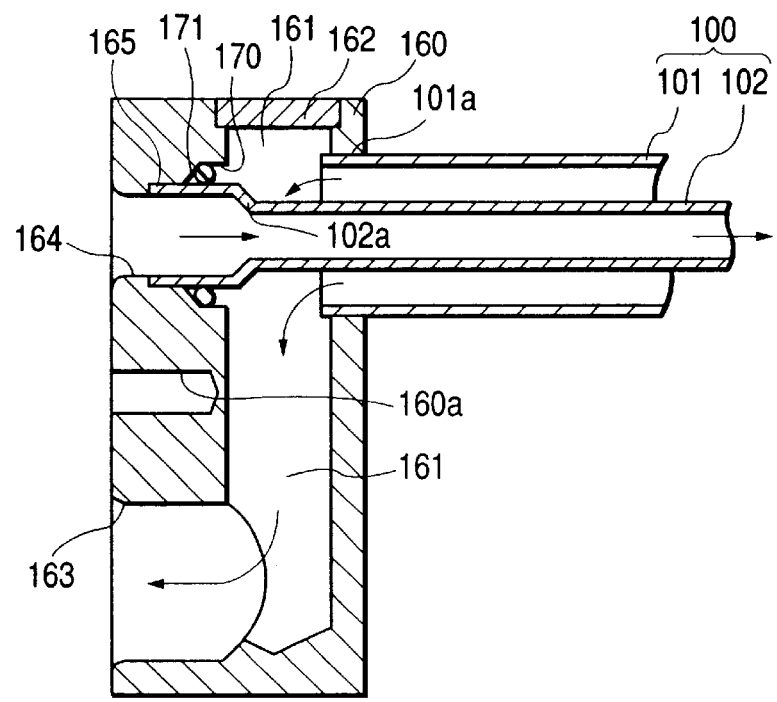
FIG. 10 is a cross sectional view showing a variation of a block shaped main body.
Figure 11:
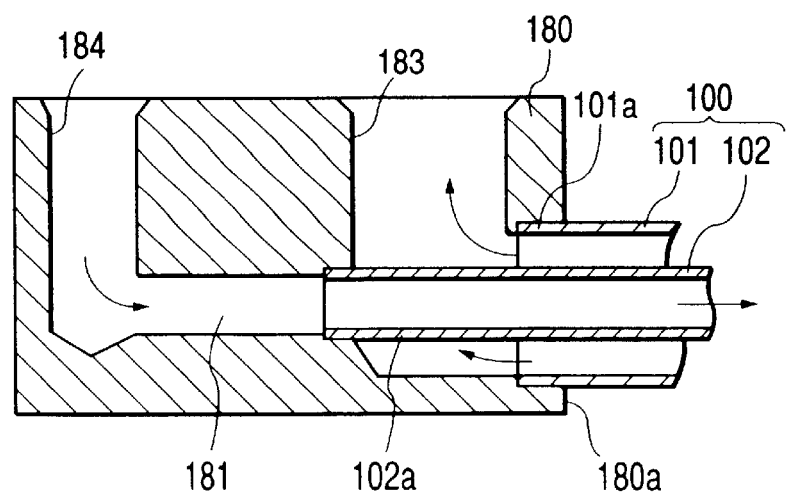
FIG. 11 is a cross sectional view sowing another variation of a block shaped main body.
Figure 12:
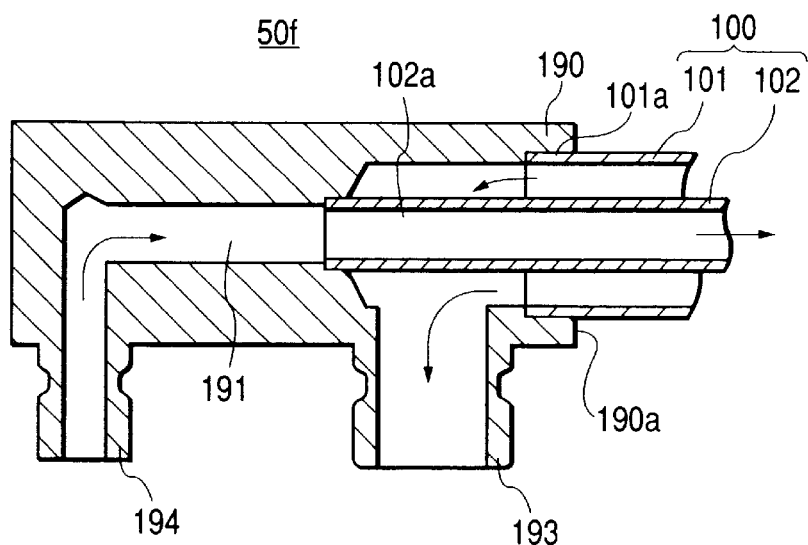
FIG. 12 is a cross sectional view sowing a further variation of a block shaped main body.

FIGS. 10 to 12 are cross sectional views showing variations of the block shaped main body.

In a joint 50d for duplex pipes shown in FIG. 10, the flare part 165 of the end portion 102a of the inner pipe is a straight pipe and is formed with a concave part 170 between the flare part 165 and the main body 160. The concave part 170 is placed with the ring-shaped brazing material 171 previously inlaid in the flare a65. In such a structure, it is no longer necessary to process the flare to expand the terminal of the flare part 165. Further, if the ring-shaped brazing material 171 is previously inlaid in the flared part 165, the brazing between the end portion 101a of the outer pipe and the main body 160, and the brazing between the end portion 102a of the inner pipe and the main body 160 can be carried out simultaneously. In addition, since the release end of the inner passage 161 is formed to the side of the duplex pipe 100, the brazings can be performed at the same time on three parts including the brazing between the blind plug and the main body 160.

In a joint 50e for duplex pipes shown in FIG. 11, the duplex pipe 100 is equipped in a side wall 180a of the main body 180, substantially crossing with the axial lines of the first and second openings 183, 184 formed in the main part 180. The end portion 101a of the outer pipe is brazed to the side wall 180a. The end portion 102a of the inner pipe is brazed at its distal part to the end of the inner passage 181 continuing to the second opening 184. In such a structure, since the duplex pipe 100 is directly attached to the release end formed in the side wall 180a for machining the inner passage 181, it is not necessary to close the release end with the blind plug. Accordingly, as parts to be brazed is reduced by one, a quality control is made easy as much, and an advantage is got in a cost.

In a joint 50f for duplex pipes shown in FIG. 12, similarly to that of FIG. 11, the duplex pipe 100 is equipped in the side wall 190a of the main body 190 as crossing with the axial lines of the first and second openings 193, 194 in the main body. The end portion 101a of the outer pipe is brazed to the side wall 190a, and the end portion 102a of the inner pipe is brazed at its distal end in the end part of the inner passage 191 continuing to the second opening 194. The exemplified first and second openings 193, 194 are formed in male convex parts. Also in such a structure, as mentioned above, as parts to be brazed is reduced by one, a quality control is made easy as much, and an advantage is got in a cost.

Next explanation will be made to the processing treatment of the end portion of the duplex pipe 100.

As shown with an imaginary line in FIG. 3, a slit 104 is marked until reaching to the outer periphery of the inner pipe at a part corresponding to the exposed length of the inner pipe 102 from the end portion of the duplex pipe. Next, the basic end of the connecting ribs 103 connected to the outer periphery 102a of the inner pipe is cut from the end part of the duplex pipe in an axial direction. At this time, a cutting machine is served which moves in the axial direction, as rotating around a guide of the inner periphery 102b of the inner pipe. As the cutting machine is rotated around the guide of the inner periphery 102b, even if a position of the inner pipe 102 is off in the radial direction, it is possible to cut the connecting rib 103 in the axial direction while keeping the thickness of the inner pipe 102 constant. When the cutting of the connecting rib 103 advances until the slit 104, the outer pipe 101 and the connecting ribs 193 are removed from the inner pipe 102 to partially expose the inner pipe 102.

In a conventionally processing method of machining the outer pipe 101 and the connecting ribs 103 in the axial direction from the end part of the duplex pipe, burrs are generated in the end part of the outer pipe removing parts of the outer pipe 101 and the connecting ribs 103, and a finishing process is required to cancel burrs. In contract, if the slit 104 is in advance formed as in this embodiment, no burr is generated in the end portion 101a of the outer pipe, and the finishing process is unnecessary and the processing work is reduced as much to simplifying the processing work.

In the above mentioned conventional processing method, if the position of the inner pipe 102 is off toward the diameter, the thickness of the end portion 102a of the exposed inner pipe is not uniform, and if practicing the punching process on the end portion 102a of the inner pipe, cracks will occur, and the punching is practically impossible. On the other hand, if cutting the connecting ribs 103 by means of the cutting structure serving the inner periphery 102b of the inner pipe as a guide face, the thickness of the inner pipe 102 can be made uniform, and thereby it is possible to practice the punching process. Therefore, the processing work of the end portion 102a of the inner pipe can be made rapidly and smoothly in comparison with the related art processing method.

Third Embodiment

Figure 13:
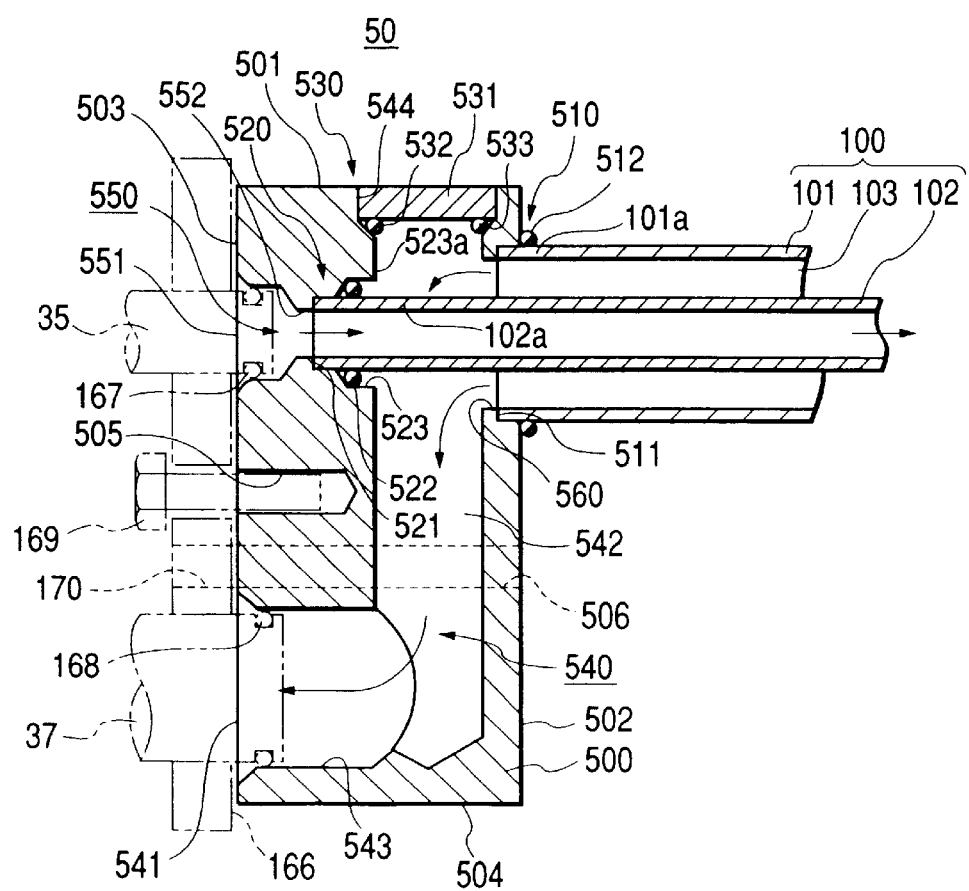
FIG. 13 is a cross sectional view showing a joint for duplex pipes relating to a third embodiment.

Further reference will be made to structures of the joints 50, 60 for duplex pipes relating to a third embodiment. As both joints 50, 60 have the same structure, explanation will be made to an example of the joint 50. FIG. 13 is a cross sectional view showing the joint 50 for duplex pipes of the third embodiment.

As shown, the duplex pipe 100 is processed at the end portion in such a manner that the outer pipe 101 and the connecting ribs 103 are partially eliminated to expose the inner pipe 102 by a desired size. The joint 50 for duplex pipes is attached by brazing to the end portion of the duplex pipe 100 which is previously performed with such processing treatment. The portion of the end of the outer pipe 101 exposing the inner pipe 102 is designated as the end portion 101a of the outer pipe, and the portion of the end of the exposed inner pipe 102 is designated as the end portion 102a of the inner pipe.

The joint 50 has a block shaped main body 500 which is formed inside with a first inner passage 540 for passing a gas coolant of low pressure and a second inner passage 550 for passing a liquid coolant of high pressure. The main body 500 is furnished with a first opening 541 and a second opening 551. The first opening 541 communicates a coolant conduit 37 (corresponding to a first outer pipe) for guiding the gas coolant of low pressure with a first inner passage 540. The second opening 551 communicates a coolant conduit 35 (corresponding to a second outer pipe) for guiding the liquid coolant of high pressure with a second inner passage 550. The main body 500 is further provided with a first connecting part 510 for connecting the end portion 101a of the outer pipe under a condition where the outer pipe 101 and a first inner passage 540 are communicated, and provided with a second connecting part 520 for connecting the end portion 102a of the inner pipe under a condition where the inner pipe 102 and a second inner passage 550 are communicated.

The first inner passage 540 is provided with a blind hole 542 bored from an upper wall face 501 (corresponding to a first wall) shown at the upper side in FIG. 13 of the main body 500 toward a lower wall face 504 shown at the lower side in the same. A first through hole 543 communicating with the blind hole 542 and a second through hole 552 are formed from a side wall face 503 continuing to the upper wall face 501 shown at the left side in the drawing. The first through hole 543 and the second through hole 552 extend in a direction crossing with the blind hole 542. The left end opening of the first through hole 543 composes the first opening 541, while the left end opening of the second through hole 552 composes the second opening 551. At a right wall face 502 (corresponding to a second wall) continuing to the upper wall 501 and shown at the right side of FIG. 13 of the main body 500, a third through hole 560 (corresponding to a passage) continuing to the blind hole 542 is formed. The blind hole 542 and the first to the third through holes 543, 552, 560 are formed by machining.

To the release end 544 of the blind hole 542, a blind plug 531 is brazed for closing the release end 544. An axial line of the second through hole 552 and an axial line of the third through hole 560 coincide with, and a first connecting part 510 is formed in the third through hole 560, while a second connecting part 520 is formed in the second through hole 552. The first inner passage 540 is formed by the first through hole 543 and blind hole 542 closed by the blind plug 531, and the second inner passage 550 is formed by the second through hole 552.

The second connecting part 520 is formed with a stopper 521 which contacts the front end of the end portion 102a of the exposed inner pipe and stops it. The stopper 521 is composed by a step formed in the second through hole 552. When the end portion 102a of the inner pipe contacts the stopper 521 at a distal end thereof, the end portion 102a of the inner pipe is positioned. The second connecting part 520 is formed with a concave part 523 for supporting the brazing material 522 for brazing the end portion 102a of the inner pipe. The concave part 523 has a tapered form in cross section becoming smaller toward an end. The concave part 523 turns upward a release mouth 523a thereof when brazing the end portion 102a of the inner pipe to the second connecting part 520, and functions to temporarily support the brazing material 522 and store a fused brazing material. By forming the concave part 523 tapered in cross section, it is made easy to guide the fused brazing material 522 into a fine space between the outer peripheral face of the end portion 102a of the inner pipe and the inner peripheral face of the second through hole 552.

The third through hole 560 is stepped, and the first connecting part 510 is also formed with a stopper 511 which contacts the front end of the end portion 101a of the outer pipe to stop it. If the front end of the end portion 101a of the outer pipe contacts the stopper 511, the end portion 101a of the outer pipe is positioned at the first connecting part 510.

The duplex pipe 100 is inserted into the main body 500 from the third through hole 560. The end portion 101a of the outer pipe is brazed to the first connecting part 510 under a condition where the end portion 101a of the outer pipe contacts the stopper 511 at its distal part. The end portion 102a of the exposed inner pipe crosses the blind hole 542 and almost stretches straight, and is brazed to the second connecting part 520 under a condition where the end portion 102a of the inner pipe contacts the stopper 521 at its distal part.

The main body 500 is defined with a screw hole 505 for securing a tightening structure composed of such as bolt or screw, and is defined with a through hole 505 for inserting a bolt.

For connecting the duplex pipe 100 to a composed body connected with the coolant pipes 35, 37 or a flange, at first the coolant pipe 37 furnished with an O-ring 168 is fitted in a first opening 541, and the coolant pipe 35 furnished with an O-ring 167 is fitted in a second opening 551. Subsequently if tightening the composed body 166 to the main body 500 by means of a bolt 169, the outer pipe 101 is communicated with the coolant conduit 37 via the first inner passage 540, while the inner pipe 102 is communicated with the coolant conduit 35 via the second inner passage 550, and the connection of the duplex pipe 100 is completed. By the O-rings 167, 168, leakage around parts connecting the coolant conduits 35, 37 is avoided. Not using the composed body 166 previously connected with the coolant conduits 35, 37, it is possible to secure the coolant conduits 35, 37 to the main body 500 by screws, respectively.

Since the first and second openings 541, 551 are formed in the left wall 503 and the third through hole 560 is formed in the left wall 502, the coolant conduits 35, 37 and the duplex pipe 100 extend in the same direction. The main body 500 and the composed body 166 mutually tightened can be secured to other composed body (not shown) by means of bolts (not shown) passing through the holes 506, 170.

According to the joint 50 for duplex pipes of the present third embodiment, the end portion 101a of the outer pipe exposing the inner pipe 102 and the end portion 102a of the exposed inner pipe are straightly inserted into the main body 500 from the third through hole 560 for performing the brazing the first and second connecting parts 510, 520, and if applying this embodiment to the duplex pipe 100 unitized of the outer pipe 101, the inner pipe 102, and the connecting ribs 103, a suited joint for duplex pipes is available.

Since the second connecting part 520 is installed in a range of almost right half of the drawing in the second through hole 552, the distal end of the end portion 102a of the inner pipe does not penetrate till the second opening 551. The O-ring 167 mounted on the coolant pipe 35 is urged to the inner periphery, so that a processing precision on the sealing face can be sufficiently secured, and a preferable sealing performance can be provided in comparison with a case of pressing the O-ring 167 to the inner periphery of the inner pipe 102. Since the inner diameter of the second connecting part 520 and the inner diameter of the sealing face are made different, the fused brazing material 522 is prevented from flowing into the sealing face. Also in this regard, the excellent sealing performance is available, and a post-treatment as removing the brazing material 522 is not required.

Next reference will be made to the method of brazing the joint for the duplex pipes to the duplex pipe 100, wherein the end portion 101a of the outer pipe is brazed to the first connecting part 510 opposite to the outer wall of the main body 500, the end portion 102a of the inner pipe is brazed to the second connecting part 520 provided at the interior of the main body 500, and the blind plug 531 is brazed to the third connecting part 530 opposite to the outer wall of the main body 500. FIGS. 14A and 4B, and FIGS. 15A and 5B are views showing sequences of brazing the joint for the duplex pipes to the duplex pipe 100.

Figure 14A:
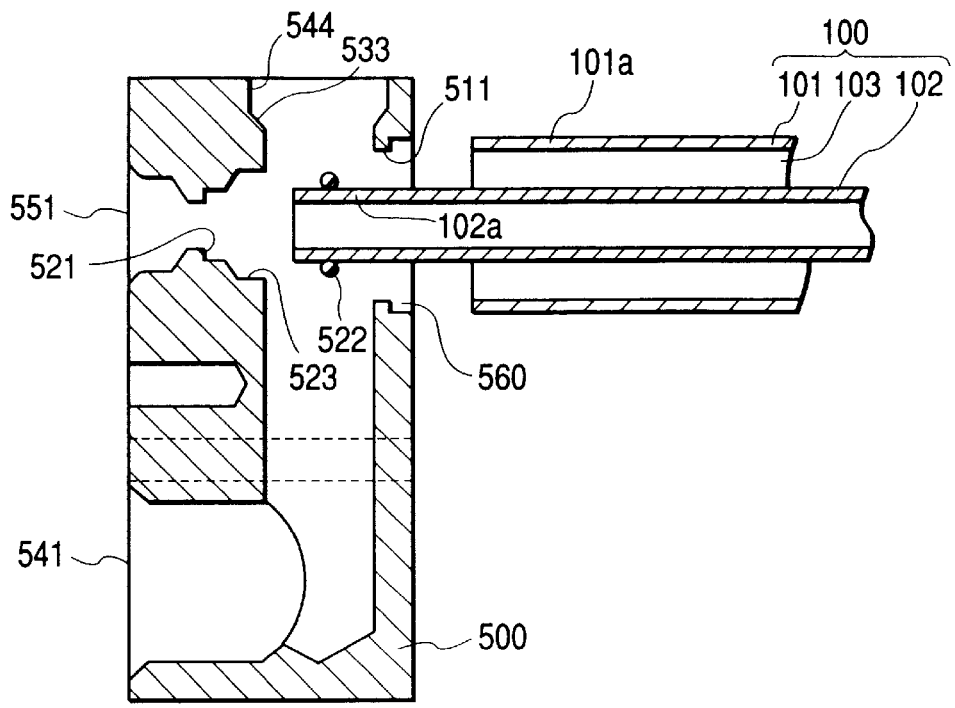
FIGS. 14A and 14B are views showing the brazing sequences of the joint for duplex pipes to the duplex pipe.

As shown in FIG. 14A, the brazing material 522 is inlaid on the end portion 102a of the inner pipe, and then the duplex pipe 100 is inserted into the main body 500 from the third through hole 560. The brazing material 522 has a ring shape containing flux.

Figure 14B:
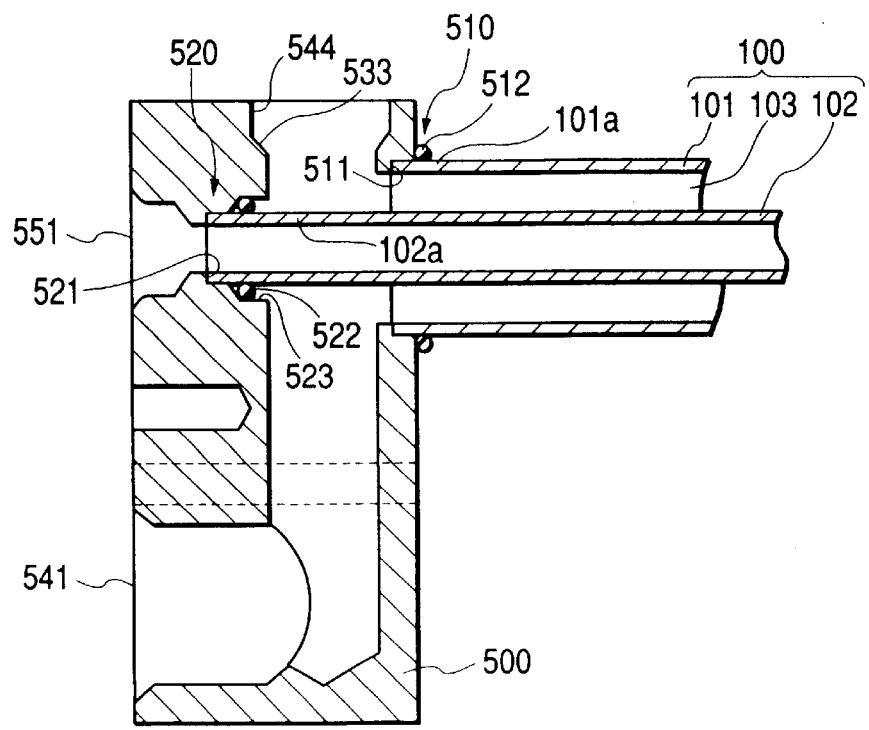

Subsequently, as shown in FIG. 14B, the duplex pipe 100 is further inserted, and the end portion 102a of the inner pipe is stopped at a stopper 521 formed in the second connecting part 520. Then, the end portion 102a of the inner pipe is placed at the second connecting part 520 under the condition of being positioned. The ring braze 522 is held in the concave part 523.

As seen in FIG. 14B, when the end portion 102a of the inner pipe is engaged at the distal part with the stopper 521, the end portion 101a of the outer pipe also contacts the stopper 511, and the end portion 101a of the outer pipe is placed at the first connecting part 510 under the condition of being positioned. Subsequently, the brazing material 512 is supplied to the first connecting part 510 following the outer circumference of the end portion 101a of the outer pipe. After inlaying the brazing material 512, the flux is coated.

Figure 15A:
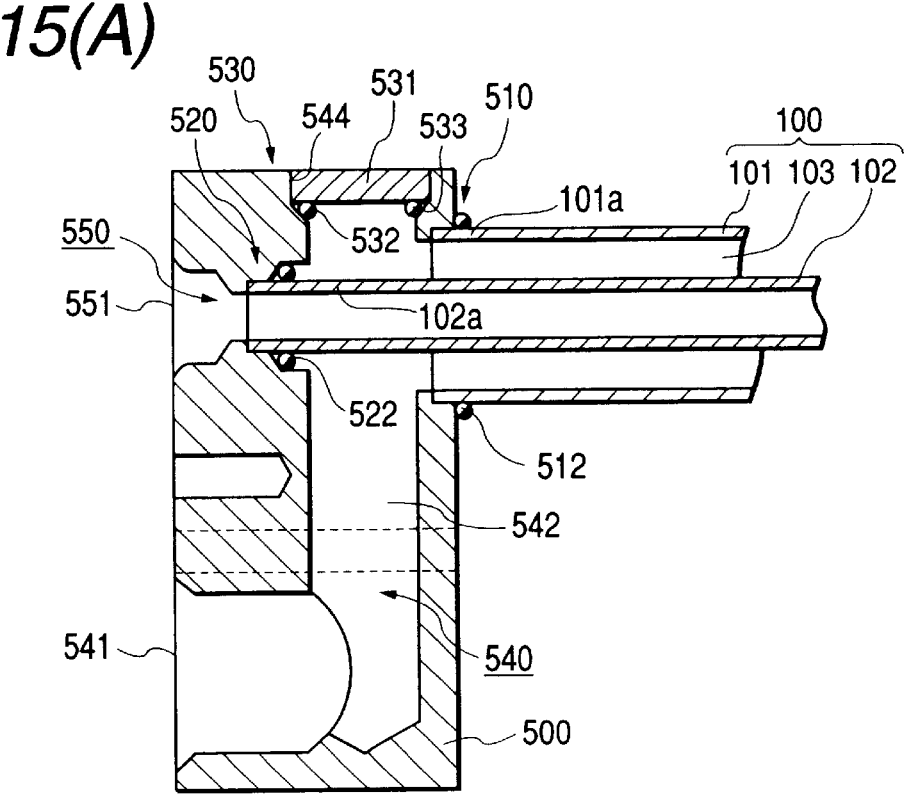
FIGS. 15A and a5B are views showing the brazing sequences of the joint for duplex pipes to the duplex pipe.

As seen in FIG. 15A, for forming the first inner passage 540, the blind plug 531 closing the release end 544 is placed to the release end 544 of the blind hole 542 bored in the main body 500, and at the same time the brazing material 532 is placed to the third connecting part 530 between the release end 544 and the blind plug 531. The brazing material 532 has a ring shape containing flux, and is in advance placed to the tapered part 533 formed in the third connecting part 530 before disposing the blind plug 531.

Figure 15B:
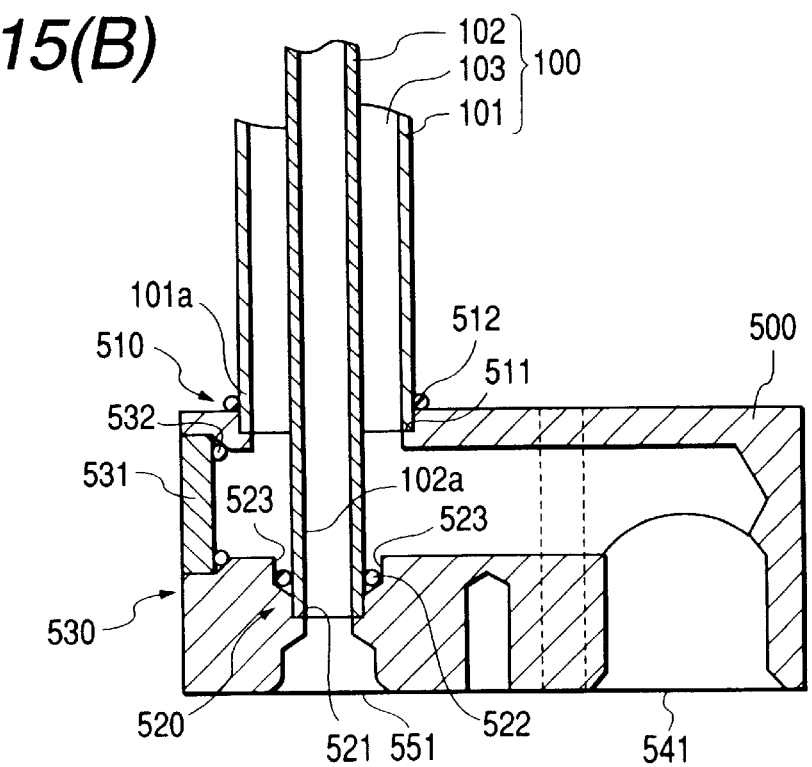

As illustrated in FIG. 15B, the main body 500, the first connecting part 510 and the third connecting part 530 are heated under the condition where the main body 500 is placed such that the release mouth 523a of the concave part 523 is turned upward, in order to fuse the ring braze 522 placed in the concave part 523 of the second connecting part 520, the brazing material 512 placed at the first connecting part 510 and the ring braze 532 placed at the third connecting part 530, thereby to simultaneously carry out the brazing of the end portion 101a of the outer pipe to the first connecting part 510, the brazing of the end portion 102a of the inner pipe to the second connecting part 520, and the brazing of the blind plug 531 to the third connecting part 530 (the brazing procedure).

As seen in the above sequences, since the brazings can be performed at the same time on the three parts of the end portion 101a of the outer pipe, the end portion 102a of the inner pipe and the blind plug 531, the connecting operation of the joint 50 for the duplex pipes to the duplex pipe 100 can be performed easily and rapidly.

As the first connecting part 510 and the third connecting part 530 are opposite to the outer wall of the main body 500, a requisite correction after the brazing is relatively easy. But since the end portion 102a of the inner pipe is brazed to the second connecting part 520 inside of the main body 500, a correction thereafter cannot be provided, and if the brazing at the second connecting part 520 is not exact, all of the joint 50 and the duplex pipe 100 are inferior.

Herein, in the third embodiment, the concave part 523 for holding the brazing material 522 is formed in the second connecting part 520, and as the release mouth 523a of the concave part 523 is turned upward when brazing, the concave part 523 fully display to function temporarily holding the brazing material 522 and a function storing the fused brazing material 522. Therefore, the brazing material 522 does not gets out from the concave part 523 to others than places requiring the brazing, but it fully penetrates into a fine space between the outer periphery of the end portion 102a of the inner pipe and the inner periphery of the second through hole 552 owing a capillary phenomenon. Thus, the end portion 102a of the inner pipe can be connected to the second connecting part 520 under necessary and sufficient strength, and the leakage of the coolant from the second connecting part 520 can be exactly avoided to check inferior production.

The heat capacity of the main body 500 is larger than those of the end portion 101*a* of the outer pipe, the end portion 102*a* of the inner pipe and the blind plug 531, and for carrying out desirable brazing, speeds of heightening temperatures in the respective parts having different heat capacities are made uniform as possible. Number of burners or torches as heating source, heating positions, temperatures or calorie are set at suited values for uniformalizing speeds of heightening temperatures.

In addition, for more uniformalizing the speeds of heightening temperatures in the respective members, the brazing procedure may include a pre-heating step for preparatively heating the main body 500 of the larger heat capacity and main-heating steps for heating the main body 500, the first connecting part 510 and the third connecting part 530. The main-heating step is performed after heightening the temperature of the main body 500 up to a predetermined temperature.

Variation of Third Embodiment

The embodiment has been shown in which the ring braze 522 is previously inlaid in the end portion 102*a* of the inner pipe with respect to the brazing work of the joint 50 to the duplex pipe 100, and such a sequence is also sufficient to previously place the ring braze in the concave part 523 and insert the end portion 102*a* of the inner pipe thereinto.

The method has been shown in which the brazings at the end portion 101*a* of the outer pipe and the end portion 102*a* of the inner pipe and the brazing of the blind plug 531 are carried out simultaneously at the three parts, and it is also sufficient to previously perform any one of the brazings at the end portion 101*a* of the outer pipe and the end portion 102*a* of the inner pipe and the brazing of the blind plug 531. In short, one part of the blind plug 531 is firstly brazed, and thereafter the remaining two parts may be brazed. Reversely, the two parts of the end portion 101*a* of the outer pipe and the end portion 102*a* of the inner pipe are firstly brazed, and the blind plug 531 is brazed thereafter.

Forms of the brazing materials 512, 522, 532 may be modified appropriately. For example, as the brazing materials to be placed at the second connecting part 520 and the third connecting part 530, instead of the ring brazes containing flux, the ring braze is placed and then the flux may be coated. As the brazing material 512 to be placed at the first connecting part 510, the ring braze containing flux may be used, and in this case, it is preferable to in advance inlay the ring braze in the end portion 101*a* of the outer pipe.

Such an example has been illustrated in which the concave part 523 supporting the brazing material 522 is formed only in the second connecting part 520, but it may be formed in the first connecting part 510. When any one of the end portion 102*a* of the inner pipe or the end portion 101*a* of the outer pipe is positioned, the other is also positioned. Accordingly, it is allowed to install the stopper 611 or 621 to at least one of the first and second connecting parts 510, 520.

The case where the end portion 102*a* of the inner pipe is straight has been illustrated, but if the second connecting part 520 has an inner diameter larger than the outer diameter of the inner pipe 102, an expanded flare part may be provided in the end portion 102*a* of the inner pipe for fitting in the second connecting part 520. The flare part is formed by punching to flare the end portion 102*a* of the inner pipe. The same is applied to end portion 101*a* of the outer pipe. Reversely to the flare part, diameters of the end portion 102*a* of the inner pipe or the end portion 101*a* of the outer pipe may be reduced.

Fourth Embodiment

Figure 16:
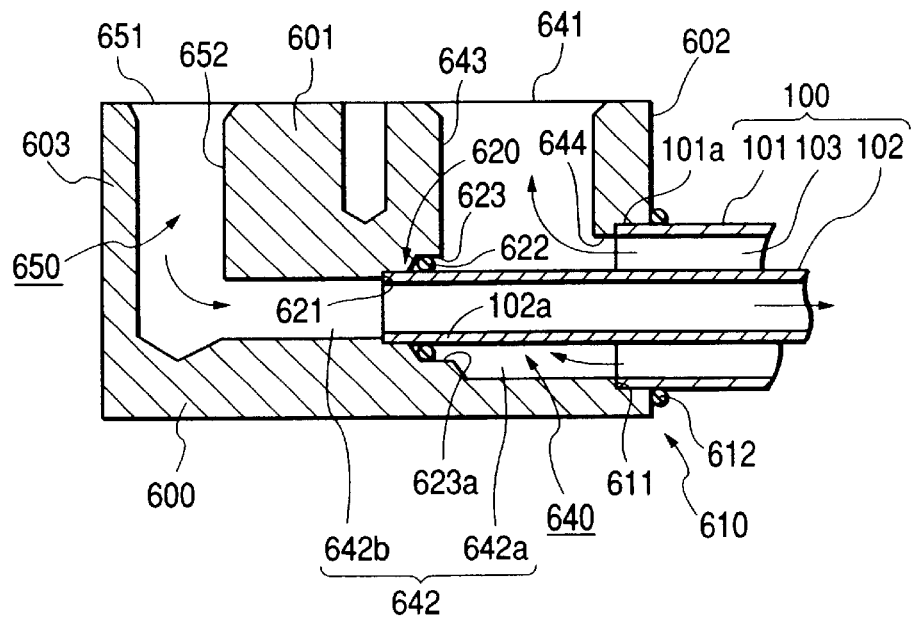
FIG. 16 is a cross sectional view sowing a joint for duplex pipes of a fourth embodiment.

FIG. 16 is a cross sectional view showing a joint 50*a* for duplex pipes relating to a fourth embodiment.

The joint 50*a* for duplex pipes relating to the fourth embodiment is different from the third embodiment in regard of omitting the blind plug 531.

The joint 50*a* for duplex pipes has a block shaped main body 600 formed inside with a first inner passage 640 and a second inner passage 650. The main body 600 is installed with a first opening 641, a second opening 651, a first connecting part 610 for connecting the end portion 101*a* of the outer pipe, and a second connecting part 620 for connecting the end portion 102*a* of the inner pipe.

The first inner passage 640 is provided with a blind hole 642 bored from a right wall face 602 (corresponding to a wall face) shown at the right side in FIG. 16 of the main body 600 toward a left wall face 603 shown at the left side in the same. The blind hole 642 has a stepwise shape composed of a large diameter basic hole 642*a* biasing to the right wall face 602 and a front end hole 642*b* of small diameter biasing to the left wall face 603. From the upper wall face 601 shown in the upper side in the drawing of the main body 600 continuing to the right wall face 602, there are formed a first through hole 643 communicating with the basic hole 642*a* of the blind hole 642 and a second through hole 652 communicating with the front end hole 642*b*. The first through hole 643 and the second through hole 652 stretch in the direction crossing with the blind hole 642. An upper opening of the first through hole 643 composes a first opening 641, while an upper opening of the second through hole 652 composes a second opening 651. The blind hole 642, and the first and second through holes 643, 652 are formed by machining.

The release end 644 of the blind hole 642 is provided with the first connecting part 610, and the front end hole 642*b* is provided with the second connecting part 620. The first inner passage 640 is formed by the first through hole 643 and the basic end hole 642*a*, while the second inner passage 650 is formed by the second through hole 652 and the front end hole 642*b*.

The second connecting part 620 is formed with a stopper 621 and a concave part 623, and the first connecting part 610 is formed with a stopper 611.

The duplex pipe 100 is inserted into the main body 600 from the release end 644 of the blind 642. The end portion 101*a* of the outer pipe is brazed to the first connecting part 610 under a condition where the end portion 101*a* of the outer pipe contacts the stopper 611 at its distal part. The end portion 102*a* of the exposed inner pipe crosses the basic end hole 642 and almost stretches straight, and is brazed to the second connecting part 620 under a condition where the end portion 102*a* of the inner pipe contacts the stopper 621 at its distal part.

The first and second openings 641, 651 are formed in the upper wall face 601, and since the release end 644 is placed in the right wall face 602, the directions in which the cooling conduits 35, 37 and the duplex pipe 100 stretch is at 90 degree.

Also with respect to the joint 50*a* for duplex pipes of this fourth embodiment, the end portion 101*a* of the outer pipe and the end portion 102*a* of the inner pipe are inserted into the main body 600 from the release end 644, and brazed to the first and second connecting part 610, 620, and if applying this embodiment to the duplex pipe 100 unitized of the outer pipe 101, the inner pipe 102, and the connecting ribs 103, a suited joint for duplex pipes is available.

As the duplex pipe 100 is directly attached to the release end 641 formed in the right wall face 602 for machining the blind hole 642, it is not necessary to close the release end 644 with the blind plug 531 as shown in the third embodiment. Accordingly, in comparison with the joint 50 for duplex pipes, as parts to be brazed is reduced by one, a quality control is made easy as much, and an advantage is got in a cost.

Figure 17:
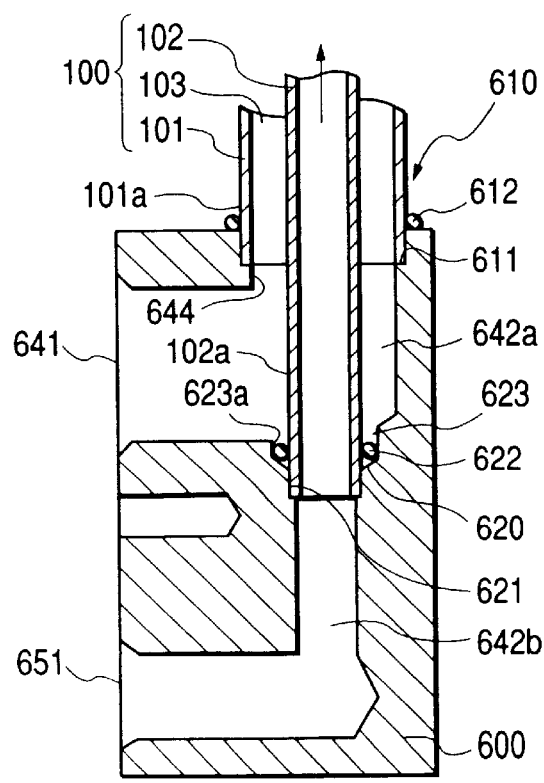
FIG. 17 is a view showing the brazing condition of the fourth embodiment.

Next reference will be made to the brazing method of the joint 50a for duplex pipes to the duplex pipe 100. FIG. 17 is a view showing a condition of brazing the fourth embodiment.

The ring braze containing flux is inlaid to the end portion 102a of the inner pipe similarly to the third embodiment, and then the duplex pipe 100 is inserted into the main body 600 from the release end 644 of the blind hole 642.

Subsequently, the duplex pipe 100 is further inserted, and the end portion 102a of the inner pipe is stopped at a stopper 621 formed in the second connecting part 620. Then, the end portion 102a of the inner pipe is placed at the second connecting part 620 under the condition of being positioned. The ring braze 622 is held in the concave part 623.

When the end portion 102a of the inner pipe is engaged at the distal part with the stopper 621, the end portion 101a of the outer pipe also contacts the stopper 611, and the end portion 101a of the outer pipe is placed at the first connecting part 610 under the condition of being positioned. Subsequently, the brazing material 612 is supplied to the first connecting part 610 following the outer circumference of the end portion 101a of the outer pipe. After inlaying the brazing material 612, the flux is coated.

As illustrated in FIG. 17, the main body 600 and the first connecting part 610 are heated under the condition where the main body 600 is placed such that the release mouth 623a of the concave part 623 is turned upward, in order to fuse the ring braze 622 placed in the concave part 623 and the brazing material 612 placed at the first connecting part 610, thereby to simultaneously carry out the brazing of the end portion 102a of the inner pipe to the second connecting part 620 (the brazing procedure).

As seen in the above sequences, since the brazings can be performed at the same time on the two parts of the end portion 101a of the outer pipe and the end portion 102a of the inner pipe, the connecting operation of the joint for the duplex pipes to the duplex pipe 100 can be performed easily and rapidly.

Further, similarly to the third embodiment, by the function of the concave part 623, the end portion 102a of the inner pipe can be connected to the second connecting part 620 under necessary and sufficient strength, and the leakage of the coolant from the second connecting part 620 can be exactly avoided to check inferior production.

For formalizing the speeds of heightening temperatures of the main body 600, the end portion 101a of the outer pipe and the end portion 102a of the inner pipe, similarly to the third embodiment, the piece number of burners as the heat source is determined as desired. The brazing procedure may include the pre-heating step for preparatively heating the main body 600, and the main-heating steps for heating the main body 600 and the first connecting part 610.

Fifth Embodiment

Figure 18:
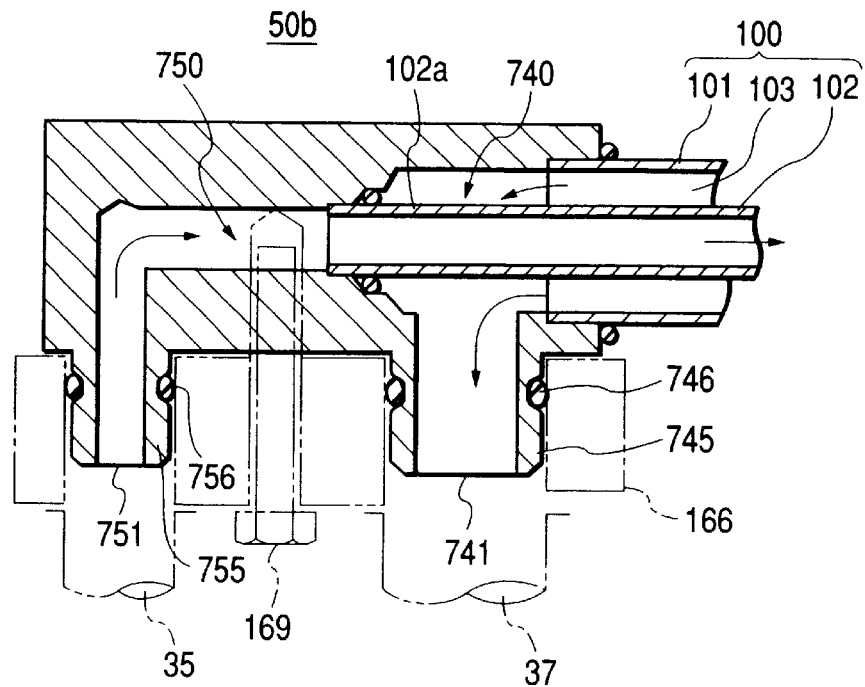
FIG. 18 is a cross sectional view sowing the joint 50b for duplex pipes of a fifth embodiment.

FIG. 18 is a cross sectional view showing a joint 50b for duplex pipes relating to a fifth embodiment.

The joint 50b for duplex pipes relating to the fifth embodiment is different from the third or fourth embodiments in regard of a connecting structure with the coolant conduits 35, 37.

In the joints 50, 50a for duplex pipes, the first openings 541, 641 and the second openings 551, 651 are composed in female type where the coolant conduits 35, 37 are inlaid at front ends. On the other hand, the first and second openings 741, 751 of the joint 50b for duplex pipes are formed in a first and a second protruded parts 745, 755 composed in male type. In ring grooves formed in the first and the second protruded parts, O-rings 746, 756 are attached respectively.

For connecting the duplex pipe 100 to a composed body 166 connected with the coolant pipes 35, 37, the first protruded part 745 and the second protruded part 755 are fitted in a hole part formed in the composed body 166. Then, if tightening a bolt 169, the outer pipe 101 is communicated with the coolant conduit 37 via a first inner passage 740, while the inner pipe 102 is communicated with the coolant conduit 35 via a second inner passage 750. Thus, the connection of the duplex pipe 100 is completed.

As other structures and the brazing sequence are the same as the fourth embodiment, explanation will be omitted.

Depending on such structure, similarly to the fourth embodiment, as parts to be brazed is reduced by one, a quality control is made easy as much, and an advantage is got in a cost.

Sixth Embodiment

Figure 19:
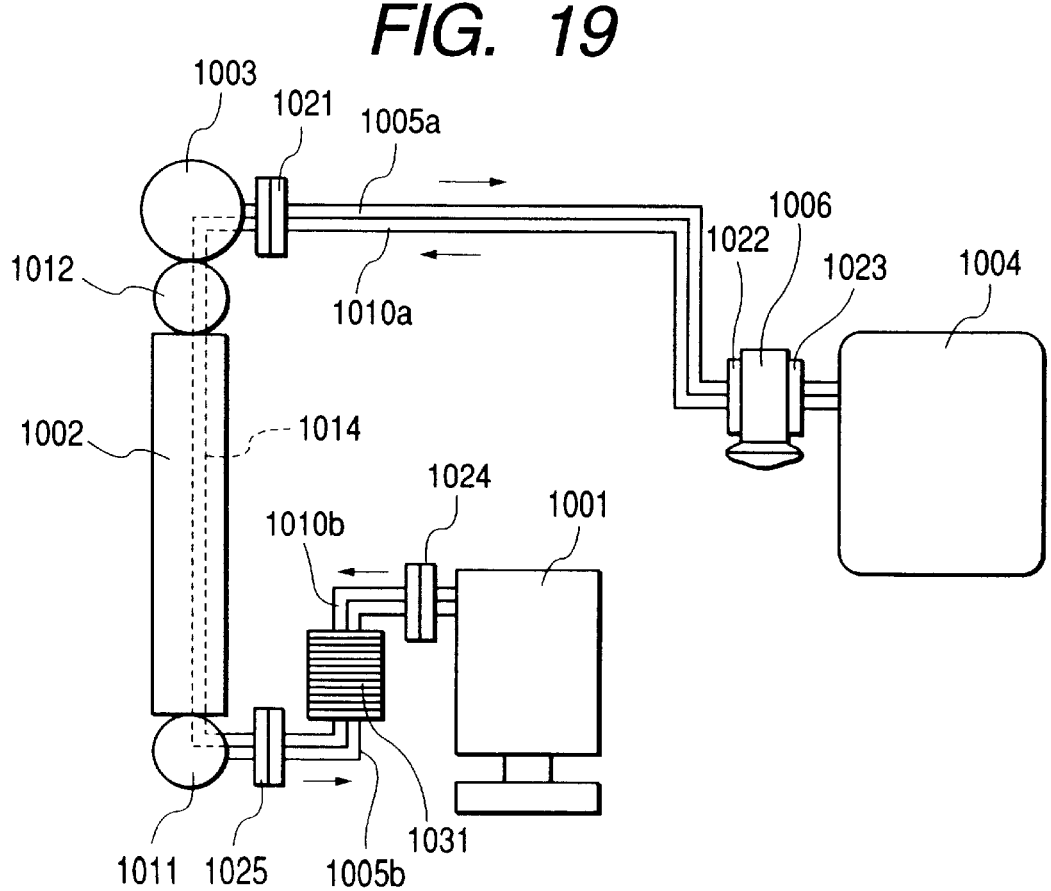
FIG. 19 is a schematic view showing the cooling cycle of the air-conditioning apparatus for vehicle according to the sixth embodiment.
Figure 20:
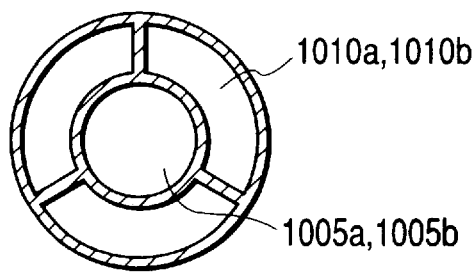
FIG. 20 is a cross-sectional view of the duplex pipe used for the structure of the pipe shown in FIG. 19.
Figure 21:
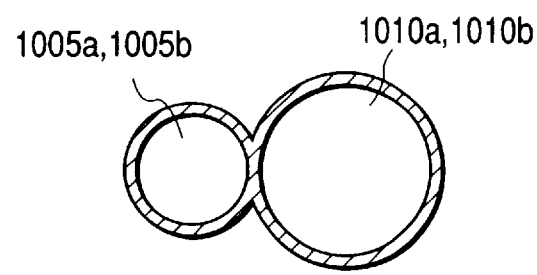
FIG. 21 is a cross-sectional view of the parallel pipe used for the structure of the pipe shown in FIG. 19.
Figure 22A:
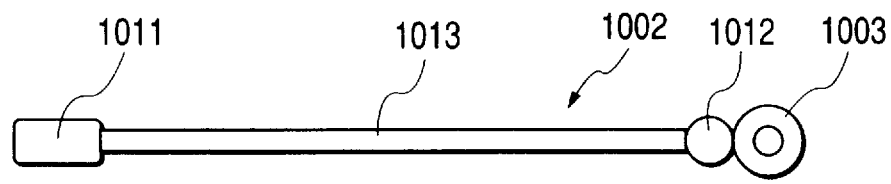
FIG. 22A is a plan view of the condenser used for the cooling cycle shown in FIG. 19.
Figure 22B:
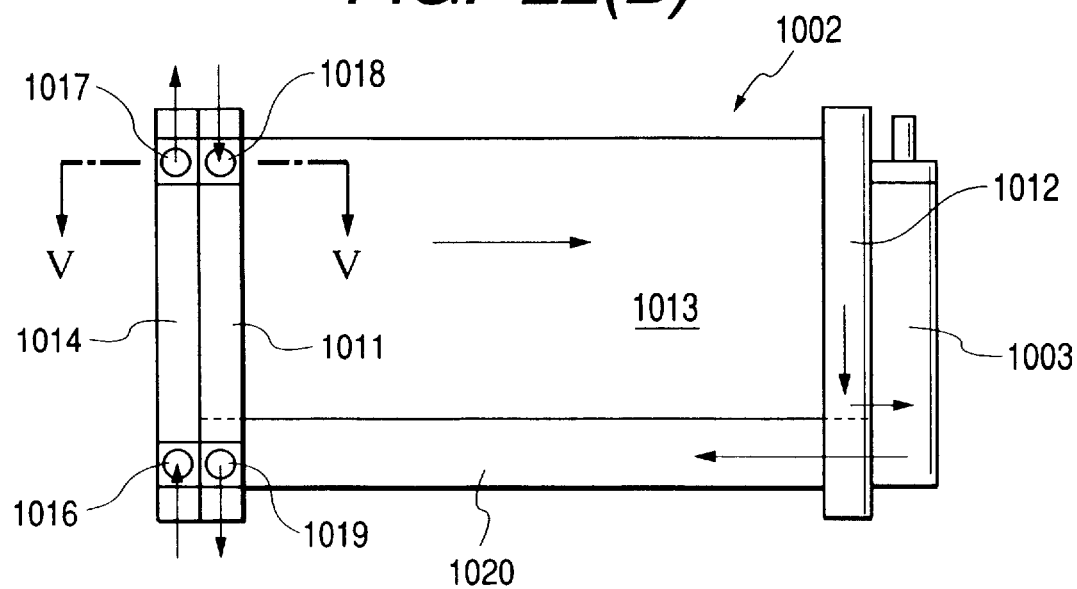
FIG. 22B is a front view of the condenser.
Figure 23:
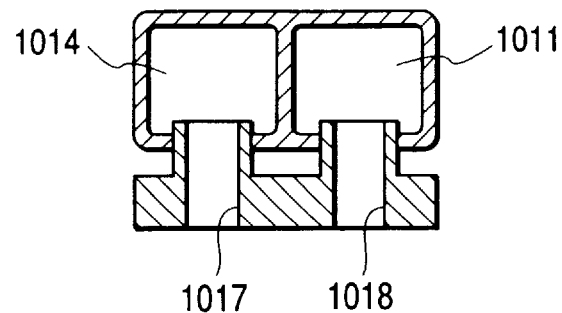
FIG. 23 is a cross-sectional view along the line of V—V in FIG. 22.

FIG. 19 is a schematic view which shows the cooling cycle of the air-conditioning apparatus for a vehicle according to a sixth embodiment, FIG. 20 is a cross-sectional view of the duplex pipe used for the structure of the pipe shown in FIG. 19, FIG. 21 is a cross-sectional view of the parallel pipe used for the structure of the pipe shown in FIG. 19, FIG. 22A is a plan view of the condenser used for the cooling cycle shown in FIG. 19, FIG. 22B is a front view of this condenser, and FIG. 23 is a cross-sectional view along the line of V—V in FIG. 22.

As shown in FIG. 19, in the cooling cycle for the air-conditioning apparatus for a vehicle, a gas coolant heated to a high temperature and pressurized to a high pressure by the compressor 1001 flows to the condenser 1002, and herein becomes a high pressure liquid coolant or a gas-liquid mixture coolant after exchanging heat with the atmosphere. The high pressure coolant becomes a low temperature and a low pressure liquid coolant or low gas-liquid mixture coolant through adiabatic expansion by the expansion valve 1006 after separation into gas and liquid in the liquid tank 1003. This low pressure coolant flows to the evaporator 1004 installed in the passenger's room, and cools the air in the compartment by exchanging heat with the air, and returns to the compressor 1001 as a low pressure gas coolant.

For the reference of the expansion valve 1006, a block type expansion valve is used, which is integrated into the block in which the inlet and outlet of the evaporator 1004 are integrally formed.

The high and low pressure coolant pipes 1005a and 1010a connecting between the evaporator 1004 and the liquid tank 1003 is constituted by a duplex pipe as shown in FIG. 20. The connecting portion of the high and low pressure coolant pipes 1005a and 1010a is provided with the pipe joints 1021, 1022, 1023. The pipe joints 1022, 1023 are installed on both sides of the expansion valve 1006 to pinch the valve there between.

For high pressure coolant pipe 1005a, the inner pipe of the duplex pipe is used to carry the high pressure liquid coolant or gas-liquid mixture coolant from the liquid tank 1003 to the expansion valve 1006 and the evaporator 1004. For the low pressure coolant pipe 1010a, the outer pipe of the duplex pipe is used to carry the low pressure gas coolant from the evaporator 1004 to the compressor 1001.

Further, for high pressure-low pressure coolant pipes 1005a and 1010a, as shown in FIG. 21, two parallel pipes, of which side faces are joined together, may be used, in this case, the small diameter pipe is used for high pressure coolant pipe 1005*a* to flow the high pressure liquid coolant or gas-liquid mixture coolant from the liquid tank 1003, and on the other hand, the large diameter pipe is used for low pressure coolant pipe 1010*a* to carry the low pressure gas coolant from the evaporator 1004.

The high and low pressure coolant pipes 1005*b* and 1010*b* connecting between the condenser 1002 and the compressor 1001 is also constituted by a duplex pipe as shown in FIG. 20. The connecting portion of the high and low coolant pipes 1005*b* and 1010*b* is also provided with pipe joints 1024 and 1025.

The inner pipe of the duplex pipe is used for the high pressure coolant pipe 1005*b* to carry the high pressure liquid coolant or gas-liquid mixture coolant from the compressor 1001 to the condenser 1002, and on the other hand, the outer pipe of the duplex pipe is used for low pressure coolant pipe 1010*b* to carry the low pressure gas coolant from the evaporator 1004 to the compressor 1001. For the high pressure and low pressure coolant pipes 1005*a* and 1010*b*, as shown in FIG. 21, parallel pipes may also be used. In this case, the numeral 1031 in the Figure shows flexible hose pipes or the like for absorbing vibration.

As shown in FIG. 22, the condenser 1002 is provided with a pair of header pipes 1011 and 1012 spaced at given distance, opposed in parallel each other. Between these pair of header pipes 1011 and 1012, the core 1013 consisting of a tube, not shown, in the Figure and heat-transfer fin is formed. The condenser 1002, in which a plurality of passages in which coolant flowing in the tube not shown in Figure flows from one header pipe 1011 to the other header pipe 1012 are formed, is so-called a multi-pass method of multi-flow type.

One header pipe 1011 is integrally provided with the bypass pipe 1014 in which the low pressure gas coolant flows from the evaporator 1004 to the compressor 1001. Specifically, one header pipe 1011 and bypass pipe 1014, as also shown in FIG. 23, are made up by a parallel pipe formed by integral extrusion. The left pipe of this parallel pipe is the bypass pipe 1014, and the right pipe is the header pipe 1011. This facilitates work to connect pipes as well as to save occupied space without obstructing the flow of the atmosphere in the condenser 1002.

The lower end of the bypass pipe 1014 is provided with the inlet 1016 for taking in the low pressure coolant from the evaporator 1004 through low pressure coolant pipe 1010*b*, and its upper end is provided with the outlet 1017 for taking out this low pressure coolant to the compressor 1001 through the low pressure coolant pipe 1010*b*. In addition, the inner diameter of the bypass pipe 1014 is preferably larger than that of the low pressure coolant pipes 1010*a* and 1010*b*. Thus, it is possible to further reduce the transmission of vibration or pulsation of the compressor 1001 to the evaporator 1004.

The upper end of one header pipe 1011 is provided with the inlet 1018 for carrying the high pressure coolant from the compressor 1001 to the core 1013 through the high pressure coolant pipe 1005*b*, and its lower end is provided with the outlet 1019 for discharging the high pressure coolant from the sub-condenser 1020, described later, to the expansion valve 1006 and the evaporator 1004 through the high pressure coolant pipe 1005*a*.

On the other header pipe 1012, the liquid tank 1003 is directly mounted, so that the coolant from the header pipe 1012 flows to the liquid tank 1003. Thereby, the number of the pipe joints can be reduced. The sub-condenser 1020 is provided under the condenser 1002, so that the coolant from the liquid tank 1003 cools further, and flows to the outlet 1019.

Thus, in the sixth embodiment, the gas coolant heated to a high temperature and pressurized to a high pressure by the compressor 1001 flows to the inlet 1018 of the header pipe 1011 of the condenser 1002 after flowing through the high pressure coolant pipe 1005*b*. The high pressure and high temperature gas coolant flows to the core 1013 from the inlet 1018, becomes a high pressure liquid coolant or a gas-liquid mixture coolant by exchanging heat with the atmosphere. This high pressure liquid coolant or gas-liquid mixture coolant flows to the liquid tank 1003, and is divided into gas and liquid, passes through the sub-condenser 1020, and flows out from the inlet 1001 of the header pipe 1011. Further, this high pressure liquid coolant or gas-liquid mixture coolant flows through the high pressure coolant pipe 1005*a*, and then flows into the evaporator 1004 through the expansion valve 1006.

On the other hand, the gas coolant depressurized to a low pressure by exchanging heat in the evaporator 1004 flows to the inlet 1016 of the bypass pipe 1014 after flowing through the low pressure coolant pipe 1010*a*, and flows out from its outlet 1017. Further, this low pressure gas coolant flows through the low pressure coolant pipe 1010*b*, and then flows into the compressor 1001.

Figure 26:
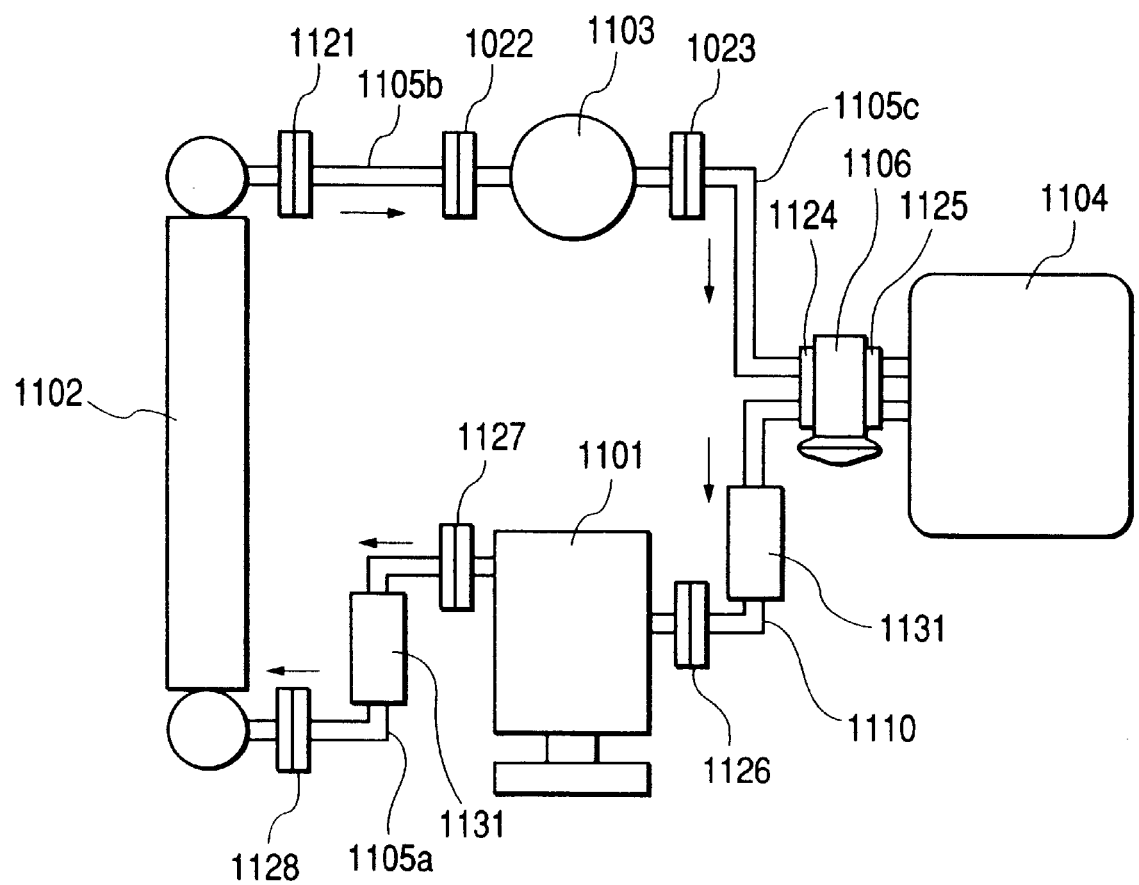
FIG. 26 is a schematic view of the cooling cycle to which the structure of the pipe for an air-conditioning apparatus for a vehicle according to the related art is applied.

As explained above, according to the sixth embodiment, the conventional coolant pipe 1110 (see FIG. 26) directly connecting the evaporator to the compressor is eliminated, as a result, the low pressure coolant pipe 1010*a* from the evaporator 1004, as the passage of low pressure coolant from the evaporator 1004, is connected to the bypass pipe 1014 integrally formed with the header pipe 1011 of the condenser 1002, and then the low pressure coolant pipe 1010*b* extending from the compressor 1001 is connected to the bypass pipe 1014.

Namely, the condenser 1002 is provided between the evaporator 1004 and the compressor 1001. Accordingly, as vibration or pulsation from the engine (not shown) and the compressor 1001 is shut down by the condenser 1002, the vibration or pulsation rarely travels to the evaporator 1004, and does not cause noise in the passenger's room, thus the noise in the passenger's room can be reduced remarkably. Thereby, that allows the anti-vibration measure of the cooling unit in which the evaporator 1004 is housed to be eased, to reduce the production cost of the cooling unit, and to make it smaller.

Further, the high and low coolant pipes 1005*a* and 1010*a*, and 1005*b* and 1010*b* are constituted by a duplex pipe or parallel pipe, and the conventional coolant pipe 1110 (FIG. 26) in which the evaporator is directly connected to the compressor is eliminated, thus that allows the number of pipe joints to be reduced comparing with the related art, and as a result, it is possible to enhance the reliability for preventing leakage of the coolant as well as to reduce the inspection man-hours for the pipe joints.

Further, the high and low coolant pipes are constituted by a duplex pipe or parallel pipe, which allows exchange heat between the coolants in both pipelines.

Accordingly, the heat of the coolant in the high pressure coolant pipe is absorbed by the coolant in the low pressure coolant pipe, which allows over cooling of the high pressure liquid or gas-liquid mixture coolant flowing out from the condenser 1002. Thereby, that allows the sub-cooling process to be replaced without providing an area working as sub-cooler in the condenser 1002, and to enhance the cooling capacity as well as to stabilize the supply of the liquid coolant to the expansion valve 1006. Further, the coolant in the low pressure coolant pipe is heated by the coolant in the high pressure coolant pipe, which allows the low pressure gas coolant flowing from the evaporator 1004 to the compressor 1001 to be heated. Thereby, that allows replacing the sub-heating process to be replaced without providing an area working as sub-heater in the evaporator 1004, and to enhance the cooling capacity as well as to prevent liquid compression in the compressor 1001.

Furthermore, there is no need to separately install two kinds of coolant pipe lines of high pressure coolant pipe and low pressure coolant pipe separately, which allows the occupied space to be reduced, and to effectively use the space in the narrow engine compartment.

Further, the condenser 1002 may be supported by an anti-vibration member (not shown) using rubber or the like. Thereby, the condenser 1002 can further damp the vibration or pulsation transmitted from the engine and the compressor 1001 to the evaporator 1004, and firmly prevent the vibration.

Figure 24A:
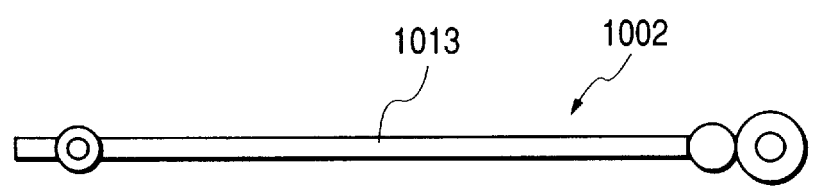
FIG. 24A is a plan view of the condenser according to an alternative example to the sixth embodiment.
Figure 24B:
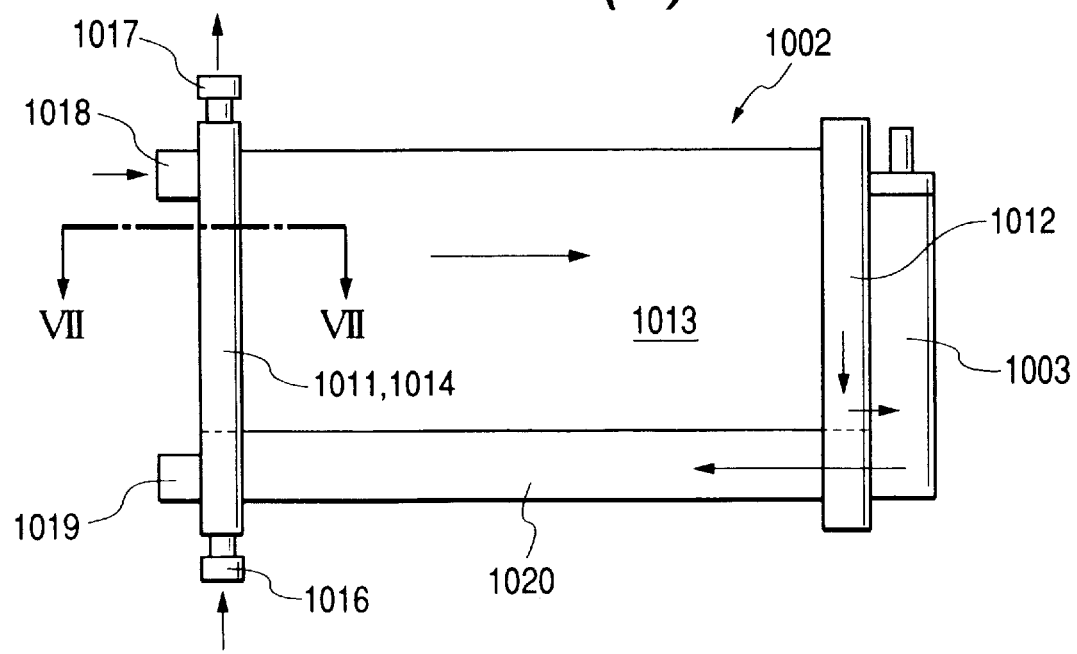
FIG. 24(B) is a front view of the condenser.
Figure 25:
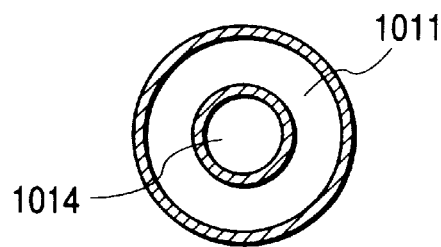
FIG. 25 is a cross-sectional view along the line of VII—VII in FIG. 24.

FIG. 24A is a plan view of the condenser according to a variation of the sixth embodiment, FIG. 24B is a front view of this condenser, and FIG. 25 is a cross-sectional view along the line of VII—VII.

In the variation, the header pipe 1011 and the bypass pipe 1014 are constituted by duplex pipes. Accordingly, as well in the variation, the low pressure coolant pipe 1010*a* from the evaporator 1004, and the low pressure coolant pipe 1010*b* to the compressor 1001, are connected to the bypass pipe 1001 of this duplex pipe, therefore the condenser 1002 can shut down the vibration or pulsation from the engine (not shown) and the compressor 1001, which allows the same effect as in the sixth embodiment explained above to be generated.

In addition, the sixth embodiments explained above are not described to limit the invention, and various modifications remain possible by those who are skilled in the art within the technical scope of the invention.

For example, in the sixth embodiment explained above, the expansion valve 1006 is used, however, it is possible to use an orifice tube as an alternative to the expansion valve. Moreover, it is also possible to add the function of an accumulator to the bypass pipe 1014.

In addition, the joints described in the first to fifth embodiments may be utilized in the cooling system of the sixth embodiment.

As mentioned above, according to the invention, if applying this mode to the duplex pipe unitized of the outer pipe, the inner pipe, and the connecting ribs, a suited joint for duplex pipes is available. Being the mode of attaching the connecting pipe to the opening of the main body, it is sufficient to only form an opening at a place determined in response to disposing conditions the connecting pipe, thereby increasing the degrees of freedom in designing dimensions and for determining the lay-out. In addition, even in such joints for duplex pipes changing the disposed conditions of the connecting pipes, the main body can be used in common to cost down through common usage of parts.

According to the invention, by processing the end portion of the inner pipe at its distal part, the communicating part is integrally formed in the inner pipe, and so the production of the joint is made easier than the case of connecting the connecting member separately produced to the end portion of the inner pipe.

According to the invention, the connecting member is exactly maintained by the concave part at the connecting part between the wall face part and the inner pipe, and the connection thereafter is made firm, so that the coolant can be certainly prevented from leakage at said connected part.

According to the invention, the resistance in the passage in the connecting pipe can be reduced, not narrowing the passage in the connecting pipe and not using a connecting pipe having an inner diameter than necessarily.

According to the invention, the attaching position of the connecting pipe for the opening can be adjusted within the range of size of the connecting part, and the common use of the main body can be more practiced, to accomplish more cost-down of parts.

According to the invention, this mode can be selected from the one-body flange, the separated flange and the nut union in response to the connecting structure of opposite sides, and are widely applicable.

According to the invention, there is no obstacle as the duplex pipe or the main body in the direction tightening the bolt. Being easy to get in the tightening as a spanner or a worker's hand, the tightening of the bolt is easily operated and the connecting work of the duplex pipe is made easy.

Also according to the invention, if the duplex pipe is unitized of the outer pipe, the inner pipe, and the connecting ribs, a suited joint for duplex pipes is available.

According to the invention and if applying to the duplex pipe unitized of the outer pipe, the inner pipe, and the connecting ribs, a suited joint for duplex pipes is available. The duplex pipe can be positioned to the main body by the stopper, and by supporting the brazing material in the concave part, the connection at the end portion of the inner pipe is made firm, thereby to exactly avoid any leakage of the coolant from the second connecting part. In particular, the blind plug may be unnecessary, and as parts to be connected are reduced by one part, a quality control is made easy as much, and an advantage is got in a cost.

According to the invention, it is easy to guide the brazing material into the space between the end portion of the inner pipe and the main body, and the connection at the end portion of the inner pipe is made more firm.

According to the invention, the two parts of the end portion of the outer pipe and the end portion of the inner pipe can be brazed concurrently under the condition of positioning the duplex pipe the main body, so that the connecting operation of the joint for the duplex pipes to the duplex pipe can be performed easily and rapidly, thereby to exactly avoid any leakage of the coolant from the second connecting part.

According to the invention, even in the joint for duplex pipes leaving the release end of the blind hole bored in the main body for forming the inner passage, the release end can be closed by the blind plug.

According to the invention, the brazings at the end portion of the outer pipe and the end portion of the inner pipe and the brazing of the blind plug are carried out simultaneously at the three parts, so that the connecting work of the joint for duplex pipes to the duplex pipe can be performed more easily and rapidly.

According to the invention, if the heat capacity of the main body is larger than those of the end portions of the outer and inner pipes, the speed of heightening the temperature is uniformalized and the excellent brazing is available.

As explained above, without directly connecting the evaporator and the compressor by coolant pipe, the low pressure coolant pipe extending from the evaporator is connected to the compressor while part of the pipe is secured to the condenser. Namely, a condenser is provided between the evaporator and compressor, therefore, as vibration or pulsation from the engine and the compressor is shut down by the condenser, the vibration or pulsation rarely travels to the evaporator, and does not cause noise in the passenger's room, thus the noise in the passenger's room can be reduced remarkably. Thereby, that allows the anti-vibration measure of the cooling unit in which the evaporator is housed to be eased, and to reduce the production cost of the cooling unit, and to make it smaller.

Furthermore, the high pressure coolant pipe and low pressure coolant pipe are installed in at least one part so that one pipe is in the other pipe or they are in parallel, thus that allows the number of pipe joints to be reduced compared with the related art, and as a result, it is possible to enhance the reliability for preventing leakage of the coolant as well as to reduce the inspection man-hours for the pipe joints.

Moreover, it is possible to exchange heat between the coolant in the high pressure coolant pipe and that in the low pressure coolant pipe. Therefore, the heat of coolant in the high pressure coolant pipe is absorbed by the coolant in the low pressure coolant pipe, which allows the high pressure liquid or gas-liquid mixture coolant flowing out from the condenser to be over cooled. Thereby, that allows the sub-cooling process to be replaced without providing an area working as sub-cooler in the condenser, and to enhance the cooling capacity as well as to stabilize the supply of the liquid coolant to the expansion valve. Further, the coolant in the low pressure coolant pipe is heated by the coolant in the high pressure coolant pipe, which allows the low pressure gas coolant flowing from the evaporator to the compressor to be heated. Thereby, that allows the sub-heating process without providing an area working as sub-heater to be replaced in the evaporator, and to enhance the cooling capacity as well as to prevent liquid compression in the compressor.

Furthermore, there is no need to separately install two kinds of coolant pipe lines of high pressure coolant pipe and low pressure coolant pipe separately, thereby this allows the occupied space to be reduced, and to effectively use the space in the narrow engine compartment.

A part of the low pressure coolant pipe is integrally formed with the header pipe of the condenser, thereby this allows the work for connecting pipes to be facilitated as well as saving the occupied space without obstructing the flow of the atmosphere in the condenser.

The liquid tank is directly mounted on the header pipe of the condenser, thereby this allows further the number of portions of pipe joints to be reduced.

The condenser is supported by the anti-vibration members, thereby this allows to further reduce vibration or pulsation transmitted from the engine and compressor to the evaporator to be further reduced, and to firmly prevent the vibration.

What is claimed is:

1. An air-conditioning apparatus for vehicle, the apparatus comprising:

a compressor for heating and pressurizing a gas coolant to high temperature and a high pressure;

a condenser for exchanging heat of the gas coolant with atmosphere to be a high pressure liquid coolant or gas-liquid mixture coolant;

a liquid tank for separating the high pressure liquid coolant or gas-liquid mixture coolant into gas and liquid;

an expansion valve for making a low temperature and low pressure liquid coolant or gas-liquid mixture coolant through adiabatic expansion;

an evaporator installed in a passenger's room of the vehicle, the evaporator for cooling air in the passenger's room by exchanging heat with the air of the passenger's room using the low temperature and low pressure liquid coolant or gas-liquid mixture coolant to be returned to the compressor as the low pressure gas coolant;

a high pressure coolant pipe for carrying the coolant from the compressor to the evaporator through the condenser; and a low pressure coolant pipe for carrying the coolant from the evaporator to the compressor, wherein at least a part of one of the low pressure coolant pipe and high pressure coolant pipe is inserted into the other thereof or both pipes are arranged in parallel; and a part of the low pressure coolant pipe is secured to the condenser.

2. The air-conditioning apparatus according to claim 1, wherein a part of the low pressure coolant pipe is formed integrally with a header pipe of the condenser.

3. The air-conditioning apparatus according to claim 1, wherein the liquid tank is directly mounted on a header pipe of the condenser.

4. The air-conditioning apparatus according to claim 1, wherein an anti-vibration member supports the condenser.

* * * * *